(12) United States Patent
Thomas et al.

(10) Patent No.: US 11,671,946 B2
(45) Date of Patent: *Jun. 6, 2023

(54) RESOURCE ALLOCATION FOR SIDELINK COMMUNICATIONS IN A WIRELESS COMMUNICATION NETWORK

(71) Applicant: Fraunhofer-Gesellschaft zur Foerderung der angewandten Forschung e.V., Munich (DE)

(72) Inventors: Robin Thomas, Berlin (DE); Thomas Wirth, Berlin (DE); Cornelius Hellge, Berlin (DE); Thomas Fehrenbach, Künzelsau (DE); Baris Göktepe, Berlin (DE); Sarun Selvanesan, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,402

(22) Filed: Apr. 5, 2022

(65) Prior Publication Data

US 2022/0264542 A1    Aug. 18, 2022

Related U.S. Application Data

(63) Continuation of application No. 16/800,267, filed on Feb. 25, 2020, now Pat. No. 11,317,383, which is a (Continued)

(30) Foreign Application Priority Data

Nov. 16, 2017  (EP) ..................... 17202110
Feb. 15, 2018  (EP) ..................... 18157012

(51) Int. Cl.
*H04W 72/04*  (2023.01)
*H04W 4/40*   (2018.01)

(52) U.S. Cl.
CPC ............. *H04W 72/04* (2013.01); *H04W 4/40* (2018.02)

(58) Field of Classification Search
CPC . H04W 72/02; H04W 72/04; H04W 72/0406; H04W 72/042; H04W 72/044;
(Continued)

(56) References Cited

U.S. PATENT DOCUMENTS 5,450,921 A   9/1995  Kameda et al.
9,549,411 B2  1/2017  Miao
(Continued)

FOREIGN PATENT DOCUMENTS

CN    101931961 A    12/2010
CN    105611499 A    5/2016
(Continued)

OTHER PUBLICATIONS

Panasonic, Discussion on channel busy ratio measurement in V2X [online], 3GPP TSG-RAN WG1#86b R1-1609571, Oct. 10, 2016, Internet <URL: http://www.3gpp.org/ftp/tsg_ran/WG1_RL1/TSGR1_86b/Docs/R1-1609571.zip , Oct. 10, 2016.
(Continued)

*Primary Examiner* — Peter Chen
(74) *Attorney, Agent, or Firm* — Perkins Coie LLP; Michael A. Glenn

(57) ABSTRACT

A transceiver for a wireless communication system for serving a plurality of user equipments is provided. A coverage area of the transceiver includes one zone or a plurality of zones, each zone having mapped thereto a resource pool. The transceiver is configured to signal to less than all user equipments assigned to a certain zone to return to the transceiver a zone occupancy report for the certain zone. The zone occupancy report indicates an occupancy status of the resource pool mapped to the certain zone.

8 Claims, 12 Drawing Sheets

Related U.S. Application Data continuation of application No. PCT/EP2018/080812, filed on Nov. 9, 2018.

(58) Field of Classification Search
CPC . H04W 72/0446; H04W 72/048; H04W 4/02; H04W 4/029; H04W 4/06; H04W 4/40; H04W 4/42; H04W 4/44; H04W 4/46; H04W 4/70; H04W 24/10; H04W 74/002; H04W 76/14; H04W 64/00; H04W 84/005

See application file for complete search history.

(56) References Cited

U.S. PATENT DOCUMENTS

| | | | |
|---|---|---|---|
| 9,609,502 | B2 | 3/2017 | Xiong et al. |
| 9,647,806 | B2 | 5/2017 | Nagata et al. |
| 2011/0258327 | A1 | 10/2011 | Phan et al. |
| 2012/0093059 | A1 | 4/2012 | Bai et al. |
| 2013/0148515 | A1 | 6/2013 | Ribeiro et al. |
| 2015/0201452 | A1 | 7/2015 | Wang et al. |
| 2015/0245193 | A1 | 8/2015 | Xiong et al. |
| 2015/0373629 | A1 | 12/2015 | Zeng et al. |
| 2016/0066337 | A1 | 3/2016 | Sartori et al. |
| 2016/0330728 | A1 | 11/2016 | Sorrentino et al. |
| 2017/0272970 | A1 | 9/2017 | Mendo Mateo et al. |
| 2017/0325214 | A1 | 11/2017 | Lu et al. |
| 2018/0176785 | A1 | 6/2018 | Chuang |
| 2019/0014444 | A1 | 1/2019 | Lei et al. |
| 2019/0306864 | A1 | 10/2019 | Tang |
| 2020/0260240 | A1 | 8/2020 | Lee et al. |

FOREIGN PATENT DOCUMENTS

| | | |
|---|---|---|
| CN | 106464610 A | 2/2017 |
| CN | 106797635 A | 5/2017 |
| CN | 106900005 A | 6/2017 |
| CN | 106937293 A | 7/2017 |
| DE | 112016000268 T5 | 10/2017 |
| KR | 960009502 B1 | 7/1996 |
| RU | 2454813 C2 | 6/2012 |
| RU | 2587992 C2 | 6/2016 |
| RU | 2654539 C2 | 5/2018 |
| WO | 2009095814 A1 | 8/2009 |
| WO | 2011043328 A1 | 4/2011 |
| WO | 2015105846 A1 | 7/2015 |
| WO | 2017026973 A1 | 2/2017 |
| WO | 2017113915 A1 | 7/2017 |
| WO | 2017121620 A1 | 7/2017 |
| WO | 2017146780 A1 | 8/2017 |

OTHER PUBLICATIONS

Fraunhofer HHI, Fraunhofer IIS, Resource Pool Sharing between V2X Mode 3 and Mode 4 UEs[online], 3GPP TSG RAN WG2#101 R2-1803342, Feb. 15, 2018, Internet <URL: http://www.3gpp.org/ftp/tsg_ran/WG2_RL2/TSGR2_101/Docs/R2-1803342.zip>, Feb. 15, 2018.

ETSI TS 136 214 V14.2.0 (Apr. 2017), LTE; Evolved Universal Terrestrial Radio Access (E-UTRA); Physical layer; Measurements (3GPP TS 36.214 version 14.2.0 Release 14), 5.1.30 Channel busy ratio (CBR), 2017.

Ericsson, "Pool Sharing between Mode-3 and Mode-4", 3GPP Technical Document—R2-1709373, Berlin—Germany, RAN2#99, Aug. 2017 , Aug. 2017.

Huawei, "Discussion on resource pool sharing between mode3 and mode4 UEs", 3GPP Technical Document—R2-1707969, Berlin—Germany, RAN#2, Aug. 2017. , Aug. 2017.

Intel, "Resource Pool Sharing between mode 3 and mode 4", 3GPP Technical Document—R2-1709049, Berlin—Germany, RAN2#99, Aug. 2017. , Aug. 2017.

Samsung, "Resource pool sharing between mode 3 and mode 4 UEs", 3GPP Technical Document—R1-1713537, Prague—Czech Republic, RAN1#90, Aug. 2017. , Aug. 2017.

ZTE, "Consideration on resource pool sharing between UEs using mode 3 and mode 4", 3GPP Technical Document—R2-1708510, Berlin—Germany, RAN#2, Aug. 2017. , Aug. 2017.

OPPO, "Summary of [100#42][eV2x] Radio Resource pool sharing", 3GPP TSG-RAN2 Meeting 101, Athens, Greece, Feb. 26-Mar. 2, 2018 , Feb. 2018.

3GPP TS 36.331 V14.2.0, 3rd Generation Partnership Project; Technical Specification Group Radio Access Network; Evolved Universal Terrestrial Radio Access (E-UTRA); Radio Resource Control (RRC); Protocol specification (Release 14), Mar. 2017 , Mar. 2017.

3GPP TS 36.212 V14.4.0, 3rd Generation Partnership Project; Technical Specification Group Radio Access Network; Evolved Universal Terrestrial Radio Access (E-UTRA); Multiplexing and channel coding (Release 14), Sep. 2017. , Sep. 2017.

3GPP TS 36.213 V14.4.0, 3rd Generation Partnership Project; Technical Specification Group Radio Access Network; Evolved Universal Terrestrial Radio Access (E-UTRA); Physical layer procedures (Release 14), Sep. 2017. , Sep. 2017.

3GPP TS 36.304 V14.4.0, 3rd Generation Partnership Project; Technical Specification Group Radio Access Network; Evolved Universal Terrestrial Radio Access (E-UTRA); User Equipment (UE) procedures in idle mode (Release 14), Sep. 2017., Sep. 2017.

CATT (rapporteur), R2-1701246, Summary of [96#63] [LTE/V2X]—CBR, 3GPP TSG RAN WG2 #97, 3GPP (Feb. 4, 2017) , Feb. 2017.

Samsung, "Congestion control in zone-based resource pool", vol. RAN WG2, No. Reno, USA; Nov. 14, 2016-Nov. 18, 2016, Nov. 4, 2016; Retrieved from the Internet: URL:http://www.3gpp.org/ftp/tsg_ran/WG2_RL2/TSGR2_96/Docs/, XP051192339 , Nov. 2016.

Panasonic, "Discussion on CBR measurement and congestion control behavior", vol. RAN WG1, No. Athens, Greece; Feb. 2017 (Feb. 12, 2017), Retrieved from the Internet: URL:http://www.3gpp.org/ftp/Meetings_3GPP_SYNC/RAN1/Docs/, XP051209093 , Feb. 2017.

Samsung, "ENB-assisted Congestion Control", vol. RAN WG2, No. Athens, Greece; Feb. 13, 2017-Feb. 17, 2017, Feb. 12, 2017 (Feb. 12, 2017), Retrieved from the Internet: URL:http://www.3gpp.org/ftp/Meetings_3GPP_SYNC/RAN2/Docs/, XP051211947 , Feb. 2017.

"Clarification to Mapping Between Service Types and V2X Frequencies", 3GPP R2-1711492; Oct. 2017.

"Congestion control in zone-based resource pool", 3GPP R2-168044; Nov. 2016.

"Discussion on zone based resource pool configuration in NR SL", 3GPP R2-1907861; May 2019.

"Handling of de-prioritized MAC PDUs", 3GPP R1-1912554; Oct. 2019.

"Panasonic: Discussion on CBR measurement and congestion control behavior", 3GPP Draft R1-1701931, XP051209093, Retrieved from the Internet: URL:http://www.3gpp.org/ftp/Meetings 3GPP SYNC/RANI/Docs/[retrieved on Feb. 12, 2017] * p. 2, lines 21-22.

"Samsung: Congestion control in zone-based resource pool", 3GPP Draft; R2-168044—Congestion Control in Zone-Based Resource Pool, 3rd Generation Partnership Project (3GPP), Mobile Competence Centre ; 650, Route Des Lucioles; XP051192339, Retrieved from the Internet:.

"Samsung: ENB-assisted Congestion Control", 3GPP Draft; R2-1701281 Enbassisted Congestion Control, 3rd Generation Partnership Project (3GPP), Mobile Competence Centre; XP051211947, URL:http://www.3gpp.org/ftp/Meetings 3GPPSYNC/RAN2/Docs/-[retrieved on Feb. 12, 2017].

Huawei, et al., "Congestion control for V2V", 3GPP Draft; R1-166166, vol. RAN_WG1, No. Gothenburg, Sweden; Aug. 22, 2016-Aug. 26, 2016 Aug. 21, 2016 (Aug. 21, 2016 ), XP051140086 Retrieved from the Internet:URL:http://www.3gpp.org/ftp/Meetings_3GPP_SYNC/RAN1/Docs/[retrieved on Aug. 21, 2016], Aug. 2016, 4 pages.

CATT, Discussion on resource pool sharing between mode 3 and mode 4, 3GPP TSG RAN WG1 Meeting #89 R1-1707450, Hangzhou, China May 15-19, 2017.

(56) References Cited

OTHER PUBLICATIONS

Samsung Electronics, "Congestion control in zone-based resource pool", R2-168044, Nov. 14-18, 2016.
ZTE, Considerations for shared resource pool between mode 3 and mode 4, 3GPP TSG RAN WG1 Meeting #89 R1-1707213, Hangzhou, P.R. China May 15-19, 2017.
Li, Nan-Nan, et al., Double Resource Allocation Handover for Vehicular, Device-to-Device Communication; 2017, 2nd International Conference on Computer, Mechatronics and Electronic Engineering (CMEE 2017).
Zhang, et al., V2X Resource Allocation Scheme Based on D2D Communication, Beijing, Oct. 2017.

| DCI 5A |
|---|
| 1. Carrier indicator -3 bits [9]<br>2. Lowest index of the subchannel allocation to the initial transmission - bits as defined in section 14.1.1.4C of [9].<br>3. SCI format 1 fields according to 5.4.3.1.2:<br>4. Frequency resource location of initial transmission and retransmission.<br>5. Time gap between initial transmission and retransmission.<br>6. SL index - 2 bits as defined in section 14.2.1 of [9] (this field is present only for cases with TDD operation with uplink-downlink configuration 0-6).<br><br>When the format 5A CRC is scrambled with SL-SPS-V-RNTI, the following fields are present:<br>    1. SL SPS configuration index - 3 bits as defined in section 14.2.1 of [9].<br>    2. Activation/release indication - 1 bit as defined in section 14.2.1 of [9].<br><br>The new and additional change would be the introduction of:<br>    1. Single bit boolean flag to send the CBR Report   ←240 |

Table 3: Downlink Control Indicator Format 5A

Fig. 7

```
                                    SIB21

-- ASN1START

SysteminformationBlockType21-r14 ::= SEQOENCE {
    s1-V2X-ConfigCommon-r14      SL-V2X-ConfigCommon-r14            OPTIONAL,    -- Need
OR
    lateNonCriticalExtension     OCTET STRING                       OPTIONAL,

}

SL-V2X-ConfigCommon-r14::=    SEQOENCE {
    v2x-CommRxPool - r14              SL-CommRxPoolListV2X-r14          OPTIONAL,  -
-Need OR
    v2x-CommTxPoolNormalCommon-r14    SL-CommRxPoolListV2X-r14          OPTIONAL,  -
-Need OR
    p2x-CommTxPoolNormalCommon-r14    SL-CommRxPoolListV2X-r14          OPTIONAL,  -
-Need OR
    v2x-CommTxPoolExceptional-r14     SL-CommResourcePoolV2X-r14        OPTIONAL,  -
-Need OR
    v2x-SyncConfig-r14                SL-SyncConfigListV2X-r14          OPTIONAL,  -
-Need OR
    v2x-InterFreqInfoList-r14         SL-InterFreqInfoListV2X-r14       OPTIONAL,  -
-Need OR
    v2x-ResourceSelectionConfig-r14      SL-CommTxPoo1SensingConfig-r14    OPTIONAL,
    zoneConfig-r14                    SL-ZoneConfig-r14                 OPTIONAL,  -
-Need OR
    typeTxSync-r14                    SL-TypeTxSync-r14
    thresSL-TxPrioritization-r14      INTEGER (0..7)                    OPTIONAL,  -
-Need OR
    offsetDFN-r14                     INTEGER (0..1000)                 OPTIONAL,  -
-Need OR
}

-SL-V2X-ModeSwitch-Thresholds ::= SEQUENCE{
TimeinIDLE
UE Speed                                              } 250
PriorityMsg

}

--ASN1STOP
```

Table 4: System Information Block Type 21

Fig. 9

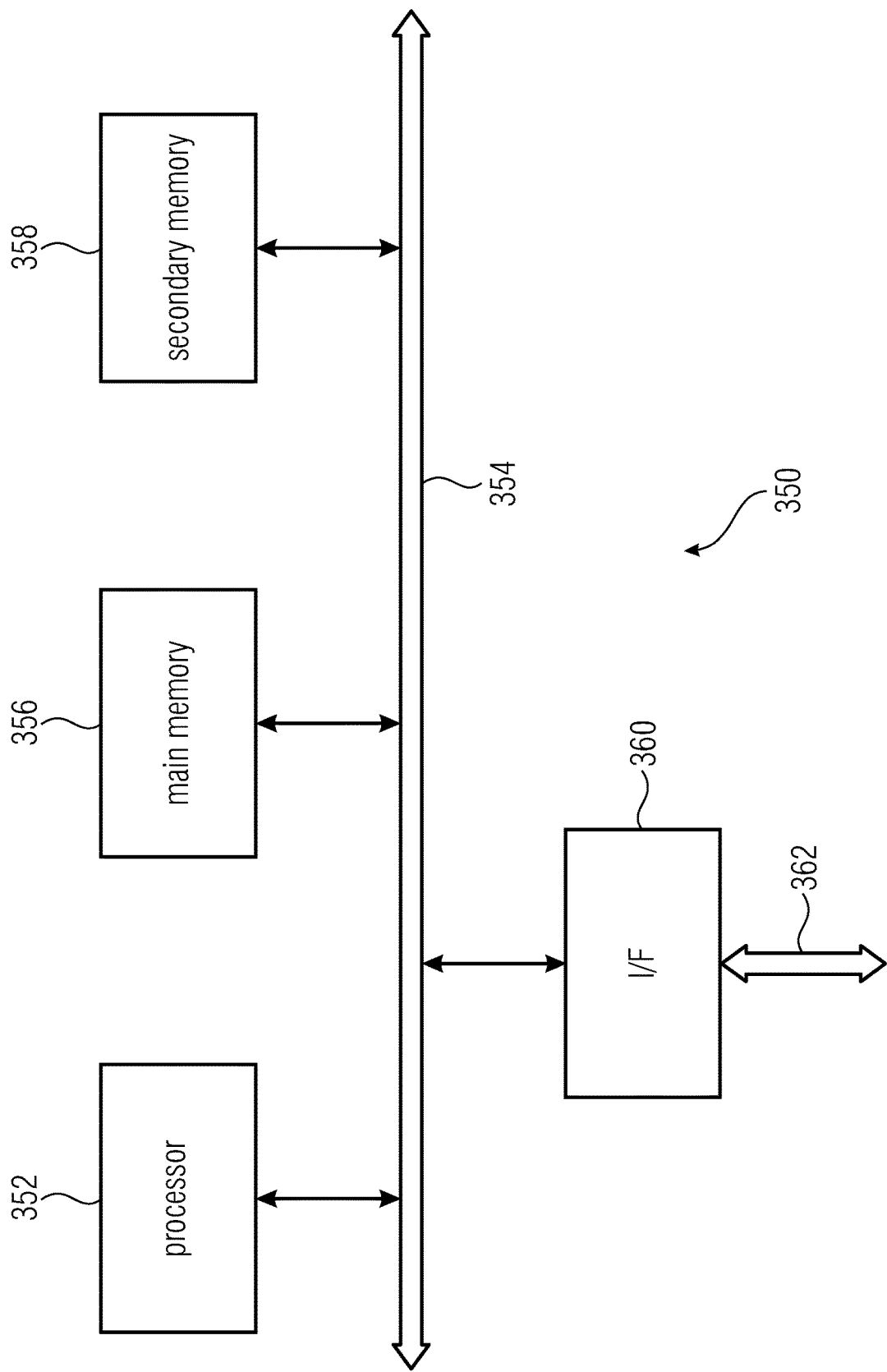

RESOURCE ALLOCATION FOR SIDELINK COMMUNICATIONS IN A WIRELESS COMMUNICATION NETWORK

CROSS-REFERENCE TO RELATED APPLICATIONS

This application is a continuation of copending U.S. patent application Ser. No. 16/800,267, filed Feb. 25, 2020, which in turn is a continuation of copending International Application No. PCT/EP2018/080812, filed Nov. 9, 2018, which is incorporated herein by reference in its entirety, and additionally claims priority from European Application No. 17202110.7, filed Nov. 16, 2017, and from European Application No. 18157012.8, filed Feb. 15, 2018, which are also incorporated herein by reference in their entirety.

BACKGROUND OF THE INVENTION

The present application concerns the field of wireless communications, more specifically a resource allocation for sidelink communications among respective entities of a wireless communication network or system. Embodiments relate to the sidelink a resource allocation for V2X Mode 3/4 user equipments or UEs.

FIG. 1 is a schematic representation of an example of a wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station (BS) refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "$gNB_5$". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

The wireless network or communication system depicted in FIG. 1 may be a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consists of a smaller number of OFDM symbols, e.g. if utilizing shortened transmission time intervals (sTTI) or a mini-slot/non-slot-based frame structure comprising of just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow $124_1$ and by the small cell base station $SeNB_1$, as indicated schematically by the arrow $124_2$.

In mobile communication networks, for example in networks like those described above with reference to FIG. 1 and FIG. 2, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs bit may comprise any of the above mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1 or on FIG. 2. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1 or in FIG. 2, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station. In each of the above-mentioned scenarios, the UEs and/or the BS should have knowledge about the resources to be used for the sidelink communication among the UEs.

FIG. 3 shows a schematic representation of a situation in which two UEs directly communicating with each other are both in coverage of a base station. The base station gNB has a coverage area that is schematically represented by the circle 200 which, basically, corresponds to the cell schematically represented in FIG. 1 or FIG. 2. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration. Mode 3 UEs may by defined as in-coverage and mode 4 UEs may be defined as out-of-coverage. In NR, UEs in-coverage are referred to as mode 1 UEs, and UEs out-of-coverage are referred to as mode 2 UEs.

FIG. 4 shows a scenario in which the UEs are not in coverage of a base station, i.e., the respective UEs directly communicating with each other are not connected to a base station (although they may be physically within a cell of a wireless communication network). Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 4 configuration.

As mentioned above, the scenario in FIG. 4 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 3, in addition to the mode 3 UEs 202, 204 also mode 4 UEs 206, 208, 210 are present. Since the mode 4 UEs 206-210 are not connected to the network, the base station gNB is not aware of resources used by the mode 4 UEs 206-210 for the sidelink communication and, likewise, the mode 4 UEs 206-210 are not aware of resources scheduled by the base station gNB to the mode 3 UEs 202, 204 for a sidelink communication. Thus, resource collisions among the UEs in the respective modes may occur.

Some approaches for addressing/avoiding resource collisions have been proposed in the art so far. One approach suggests that mode 3 UEs and mode 4 UEs have information about each other's resource usage. For the UEs a dedicated resource pool has been suggested, however, mode 4 UEs are typically out-of-coverage with statically pre-allocated resource pools within which the UE performs sensing. Another approach allows mode 4 UEs to share resources of mode 3 UEs, while mode 4 UEs vacate mode 3 UE resources (see reference [1]). Other approaches teach to set the resource reservation for mode 3 UEs from zero to the SPS period in the sidelink control indicator (SCI) format 1 so that the used resources are reserved accordingly in a similar fashion to mode 4 UE operation. Further, a mode type field of the UE may be added to the SCI format 1 so that mode 4 UEs may identify and exclude resources allocated to mode 3 UEs during a sensing operation (see reference [2]).

In accordance with another approach (see reference [3]), mode 3 UEs report that the resource utilization of mode 4 UEs or any unreserved resources to the base station via respective measurements. The mode 3 UEs need to be capable of sensing and reporting measurement information about the radio environment. To limit the search space, the mode 3 UEs report usage only for a shared resource pool including mode 3 UEs and mode 4 UEs which may result, however, in additional overhead and may not provide backward compatibility.

References [4] and [5] suggest sharing resource pools for both mode 3 UEs and mode 4 UEs, which, however, entails resources to be allocated in a dynamic or a semi-static fashion.

Starting from the known technology discussed above, it is an objective underlying the present invention to provide an improved approach for handling Mode 3 UEs and Mode 4 UEs in a wireless communication network.

SUMMARY

According to an embodiment, a user device, UE, for a wireless communication system, may have: an antenna; and a signal processor, wherein the user device is served by a base station of the wireless communication system, a coverage area of the base station comprising one geographical zone or a plurality of geographical zones, and each geographical zone having mapped thereto a resource pool, wherein the user device is to perform a measurement of resources of the resource pool for the geographical zone in which the user device is located, for determining whether a resource of the resource pool is used or unused, wherein, responsive to a request from the base station, the signal processor is to create, using the measurement, a zone occupancy report for the geographical zone in which the user device is located, the zone occupancy report indicating an occupancy status of the resource pool mapped to the geographical zone, the zone occupancy report being returned to the base station via the antenna, wherein the zone occupancy report comprises one or a combination of the following: (i) a resource vector giving the occupancy for resource blocks of the resource pool, (ii) a predefined number of resources of the resource pool, wherein (i) the resource vector indicates a percentage of occupancy per set of physical resource blocks, PRBs, or indicates the free PRBs, and (ii) the predefined number of resources per resource pool are top-m resource blocks based on a statistic of the least occupied PRBs or the PRBs comprising the lowest received power, wherein the user device is to operate in accordance with a first mode, for example the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, for example the V2X Mode 3, in case one or more predefined criteria are met by the user device, and wherein, in the second mode, scheduling of resources for the sidelink communication with the one or more other user devices is performed by the transceiver.

According to another embodiment, a wireless communication system, may have: one or more base stations, and one or more user devices, UEs, the one or more UEs comprising: an antenna; and a signal processor, wherein the user device that is served by one of the one or more base stations, a coverage area of the base station comprising one geographical zone or a plurality of geographical zones, and each geographical zone having mapped thereto a resource pool, wherein the user device is to perform a measurement of resources of the resource pool for the geographical zone in which the user device is located, for determining whether a resource of the resource pool is used or unused, wherein, responsive to a request from the base station, the signal processor is to create, using the measurement, a zone occupancy report for the geographical zone in which the user device is located, the zone occupancy report indicating an occupancy status of the resource pool mapped to the geographical zone, the zone occupancy report being returned to the base station via the antenna, wherein the zone occupancy report comprises one or a combination of the following: (i) a resource vector giving the occupancy for resource blocks of the resource pool, (ii) a predefined number of resources of the resource pool, wherein (i) the resource vector indicates a percentage of occupancy per set of physical resource blocks, PRBs, or indicates the free PRBs, and (ii) the predefined number of resources per resource pool are top-m resource blocks based on a statistic of the least occupied PRBs or the PRBs comprising the lowest received power, wherein the user device is to operate in accordance with a first mode, for example the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, for example the V2X Mode 3, in case one or more predefined criteria are met by the user device, and wherein, in the second mode, scheduling of resources for the sidelink communication with the one or more other user devices is performed by the transceiver.

According to another embodiment, a method for a user device for a wireless communication system, the user device being served by a base station of the wireless communication system, a coverage area of the base station comprising one geographical zone or a plurality of geographical zones, and each geographical zone having mapped thereto a resource pool, may have the steps of: performing, by the user device, a measurement of resources of the resource pool for the geographical zone in which the user device is located, for determining whether a resource of the resource pool is used or unused, responsive to a request from the base station, creating, using the measurement, and returning, by the user device, to the base station a zone occupancy report for the geographical zone in which the user device is located, the zone occupancy report indicating an occupancy status of the resource pool mapped to the geographical zone, wherein the occupancy report comprises one or a combination of the following: (i) a resource vector giving the occupancy for resource blocks, (ii) a predefined number of resources of the resource pool, and wherein (i) the resource vector indicates a percentage of occupancy per set of physical resource blocks, PRBs, or indicates the free PRBs, and (ii) the predefined number of resources per resource pool are top-m resource blocks based on a statistic of the least occupied PRBs or the PRBs comprising the lowest received power, wherein the user device is to operate in accordance with a first mode, for example the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, for example the V2X Mode 3, in case one or more predefined criteria are met by the user device, and wherein, in the second mode, scheduling of resources for the sidelink communication with the one or more other user devices is performed by the transceiver.

Another embodiment may have a non-transitory digital storage medium having stored thereon a computer program including instructions causing a computer to perform the inventive method for a user device for a wireless communication system, the user device being served by a base station of the wireless communication system, a coverage area of the base station comprising one geographical zone or a plurality of geographical zones, and each geographical zone having mapped thereto a resource pool.

BRIEF DESCRIPTION OF THE DRAWINGS

Embodiments of the present invention are now described in further detail with reference to the accompanying drawings, in which:

FIG. 7 shows an example of a downlink control indicator of the format 5A which has been modified in accordance with embodiments of the first aspect by adding a single bit Boolean flag;

FIG. 9 depicts a system information block modified in accordance with embodiments of the third aspect of the present invention;

FIG. 11 illustrates an example of a computer system on which units or modules as well as the steps of the methods described in accordance with the inventive approach may execute.

DETAILED DESCRIPTION OF THE INVENTION

Embodiments of the present invention is now to described in more detail with reference to the accompanying drawings in which the same or similar elements have the same reference signs assigned.

As mentioned above, UEs of a wireless communication system may directly communicate with each other using the sidelink, which is also referred to as device-to-device (D2D) communication, a vehicle-to-vehicle (V2V) communication or a vehicle-to-everything (V2X) communication. In the following aspects of the inventive approach will be described mainly with reference to V2V or V2X communications, however, the inventive approach is not limited to such scenarios and is equally applicable to other communications using the sidelink, e.g., to D2D communications.

Figure 3:
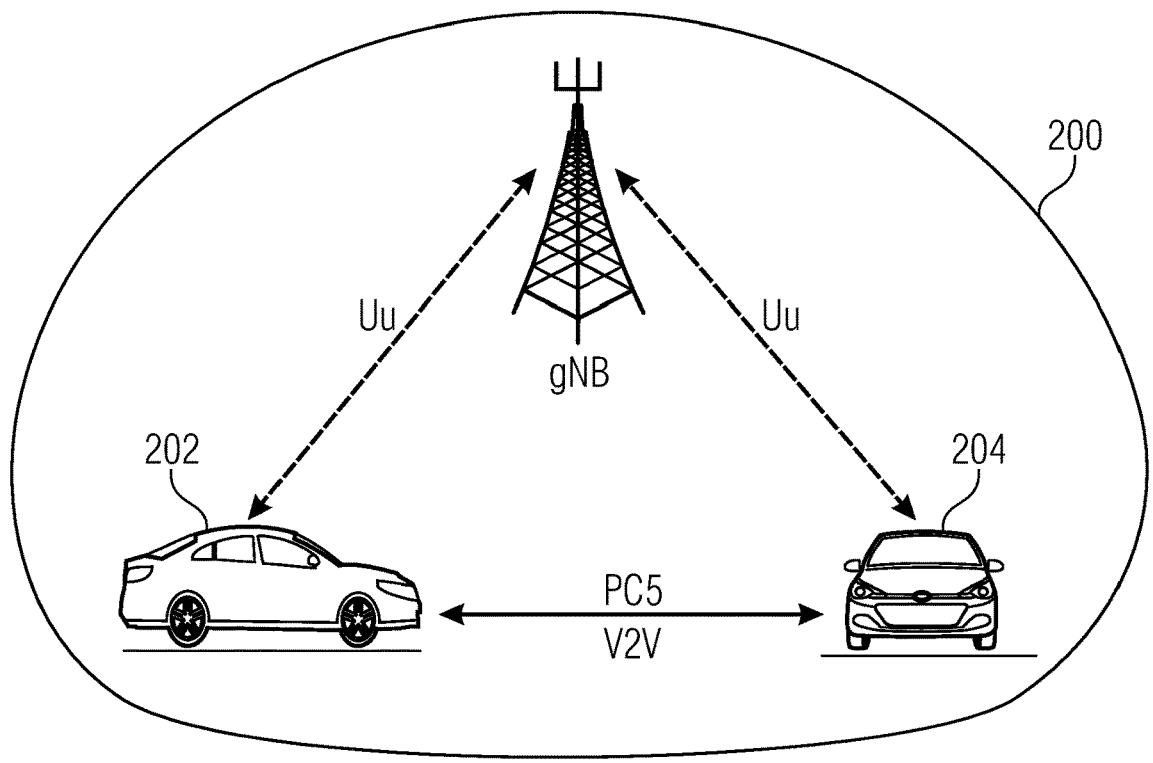
FIG. 3 shows a schematic representation of a situation in which UEs directly communicating with each other are in coverage of a base station.
Figure 4:
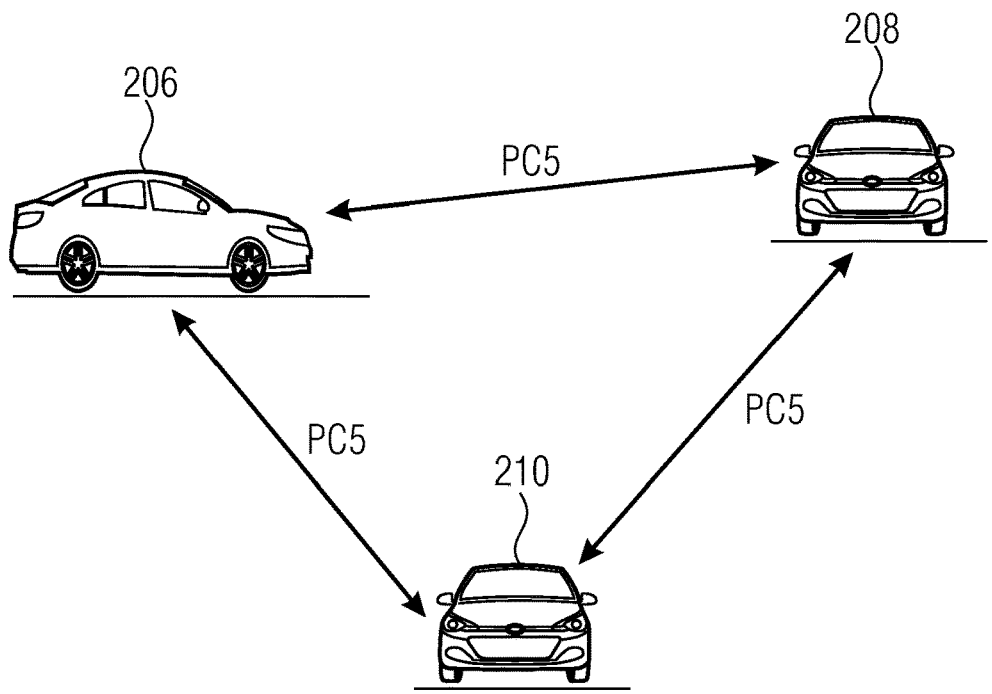
FIG. 4 shows a scenario in which UEs directly communicating with each other are not are not in coverage of a base station, i.e., are not connected to a base station.

From a resource allocation perspective, the configurations described above with reference to FIG. 3 and FIG. 4 need to be considered, namely the mode 3 configuration and the mode 4 configuration. The mode 3 configuration, for example the V2X mode 3 configuration, involves the scheduling and/or interference management of resources by the base station (see FIG. 3) for the respective UEs, like the vehicles 202, 204, within the coverage 200 of the base station, so as to enable the sidelink communication. The control signaling is provided to the UE over the Uu interface, for example via a respective downlink control indicator (DCI), and the resources may be dynamically assigned by the base station. In the mode 4 configuration (see FIG. 4), for example in the V2X mode 4 configuration, SL communications are performed on a pre-configured resource configuration, and the scheduling and/or interference management is performed autonomously, e.g., by using distributed or de-centralized algorithms. The UEs, which operate in the mode 4 configuration, perform, for example, a partial sensing, based on the channel busy ratio (CBR), to autonomously determine if a particular resource is used/unused for SL communications. The mode 4 UE resource pool allocation and the mode 3 UE resource pool allocation are independent of each other so that there is a high probability of collisions, e.g., when the traffic density in a cell is high which, inevitably, may lead to poor network performance and a decrease in reliability.

At this time, despite the above mentioned conventional approaches, there is no efficient approach to allow co-existence between mode 4 UEs and mode 3 UEs, and the inventive approach as described herein addresses the issue of resource allocation for sidelink communications in a wireless communication network so as to allow for an improved handling of coexisting mode 3 UEs and mode 4 UEs in a wireless communication network, like the one described above with reference to FIG. 1 and FIG. 2. To improve the handling of mode 3/mode 4 UEs in wireless communication networks, the inventive approach teaches a number aspects that may be used independent from each other or two or more of the aspects may be combined.

First Aspect

A first aspect of the inventive approach assumes a base station having a coverage area including one or a plurality of zones, and mode 3 UEs and mode 4 UEs may have the capability to identify the zone ID within which they are located, for example, based on their geographical position. When the coverage area includes a plurality of zones, the respective zone IDs are either pre-configured by higher layers of the communication network or are determined by the base station itself. The zone ID is a mapping of geographical coordinates to a specific resource pool to be used for sidelink communications which includes a set of sub-channels which may include both control and data channels. Based on the zone ID, a singular or unique resource pool for sidelink communications is mapped to the zone. In conventional approaches as suggested so far, only a mode 4 UE carries out the sensing and determination of the channel busy ratio (CBR), which indicates the occupancy status of the resource pool. Allocating a single resource pool per zone ID allows all UEs having the same zone ID to sense the same resource pool and to have the same occupancy status report. However, transmitting occupancy status reports from all of the UEs within a specific zone results in a substantial signaling overhead within the cell.

In accordance with the first aspect of the inventive approach, a transceiver for a wireless communication system for serving a plurality of user equipments is provided, wherein a coverage area of the transceiver includes one zone or a plurality of zones, each zone having mapped thereto a resource pool, and wherein the transceiver is configured to signal to less than all user equipments assigned to a certain zone to return to the transceiver a zone occupancy report for the certain zone, the zone occupancy report indicating an occupancy status of the resource pool mapped to the certain zone.

Also, in accordance with the first aspect of the inventive approach, a user equipment for a wireless communication system is provided, wherein the user equipment is served by a transceiver of the wireless communication system, a coverage area of the transceiver including one zone or a plurality of zones, and each zone having mapped thereto a resource pool, and wherein, responsive to a request from the transceiver, the user equipment is configured to return to the transceiver a zone occupancy report for the zone in which the user equipment is located, the zone occupancy report indicating an occupancy status of the resource pool mapped to the zone.

For example, a base station may select a single or a subset of the UEs among all UEs having the same zone ID, based on a predefined criterion, to transmit the occupancy status report back to the base station. The UEs among all UEs having the same zone ID may include both mode 3 UEs and mode 4 UEs. Reducing the number of UEs transmitting the occupancy report back to the base station reduces the signaling overhead, thereby improving the performance and efficiency of the wireless communication network.

In accordance with embodiments, the occupancy report signaled by a UE may contain one or a combination of the following:
(i) A usage ratio, like CBR (channel busy ratio):
   The channel busy ratio (CBR) measured in subframe n may be defined as follows (see 3GPP TS 136 214 V14.2.0 (2017-04), Channel busy ratio):
      for the physical sidelink shared channel (PSSCH), the portion of sub-channels in the resource pool whose S-RSSI measured by a UE exceeds a (pre-) configured threshold sensed over subframes [n−100, n−1],
      for the physical sidelink control channel (PSCCH), in a pool (pre)configured such that PSCCH may be transmitted with its corresponding PSSCH in non-adjacent resource blocks, the portion of the resources of the PSCCH pool whose S-RSSI measured by the UE exceeds a (pre-)configured threshold sensed over subframes [n−100, n−1], assuming that the PSCCH pool is composed of resources with a size of two consecutive physical resource block (PRB) pairs in the frequency domain.
(ii) A resource vector giving the occupancy for resource blocks, e.g., the percentage of occupancy per set of physical resource blocks (PRBs) or the exact number of free PRBs.
(iii) The top-m resource blocks based on a statistic of best resources, the least occupied PRBs or the PRBs containing the lowest received power (RSSI).

In accordance with embodiments, based on the resource occupancy reports from the respective zones, the base station may create a zonal area resource usage map (ZARUM) of the geographical zones that may be used for the resource allocation for the sidelink communications, e.g. in situations in which a UE moves from one zone to another zone. The ZARUM-map constructed at the transceiver (e.g. a base station) may depict one or more zones in a cell. The ZARUM-map includes information for each of the zones. The information may include one or more of the following:
(i) the CBR for each of the zone's resource pools,
(ii) a map of vectors containing the occupancy of the resource blocks for each zone,
(iii) a map containing a list of free resources per resource pool (coming, e.g., from the top-m statistic).

In accordance with further embodiments, a UE may provide not only the occupancy status report for the zone in which it is located, but the UE may also obtain the occupancy status, for example the CBRs, from neighboring zones, i.e., zones that are directly adjacent to the zone in which the UE is located. This allows to reduce the signaling overhead even further as a reduced number of UEs is needed to acquire the occupancy status reports from a plurality of zones as one UE may provide two or more occupancy reports to the BS.

In accordance with an embodiment of the first aspect, each zone of the coverage area of the transceiver is identified by a zone identifier, wherein a user equipment located within a zone of the coverage area of the transceiver has associated therewith the zone identifier of the zone, and wherein the transceiver is configured to signal to less than all user equipments having the same zone identifier to return to the transceiver the zone occupancy report.

In accordance with an embodiment of the first aspect, the transceiver is configured to select from a plurality of user equipments assigned to a certain zone, less than all user equipments to return to the transceiver the zone occupancy report for the certain zone.

In accordance with an embodiment of the first aspect, a user equipment is selected dependent on one or more of the following criteria: (i) the user equipment performs an uplink transmission to the transceiver at a pre-defined time or within a pre-defined time period following the start of an uplink transmission period (PUSCH); (ii) the user equipment transmits packets on a regular basis, e.g. a user equipment running VoLTE; (iii) a quality of a link of the user equipment to the transceiver; (iv) a class of the user equipment.

In accordance with an embodiment of the first aspect, in case the transceiver is configured to schedule uplink transmissions of the user equipments, the transceiver has knowledge about the time of uplink transmissions of the user equipments, and the transceiver is configured to select a user equipment based on the knowledge.

In accordance with an embodiment of the first aspect, the transceiver is configured to send along with a control information message a request to send the occupancy report to the transceiver to the selected user equipments.

In accordance with an embodiment of the first aspect, the control information message includes: (i) a flag, the flag set to a first value, for example false, when the zone occupancy report is not to be returned, and the flag set to second value, for example true, when the zone occupancy report is to be returned, and/or (ii) points in time or time intervals at which the occupancy report is to be send to the transceiver.

In accordance with an embodiment of the first aspect, the control information message is a downlink control indicator (DCI), for example a DCI format 5a, or a RRC-signaling message. The present invention is not limited to such control information messages. In accordance with other embodiments other messages provided to a UE may be used to signal that the occupancy report is to be send by the UE to which the message is directed. For example, in scenarios in which UEs may communicate via a sidelink without any downlink and/or uplink channels, like communications not involving a base station, the control information may be send in the sidelink control indicator (SCI). For example, in a moving cell scenario, like a bus, there is an entity providing for the connection to a network, while the UEs in the bus communicate with this entity, e.g., using sidelink communications. In such a scenario, there is no downlink control information send from the entity to the respective UEs so that the SCI may be used for conveying any control information to the UEs.

In accordance with an embodiment of the first aspect, the transceiver is configured to receive from a user equipment a first zone occupancy report for the zone in which the user equipment is located, and one or more second zone occupancy reports from one or more directly neighboring zones.

In accordance with an embodiment of the first aspect, the resources of the resource pool comprise resources for a sidelink communication of two or more user equipments, and/or the zone occupancy report includes channel busy ratios (CBRs) for the zone.

In accordance with an embodiment of the first aspect, the transceiver is configured to create, using the zone occupancy reports obtained for the one or more zones, a zonal area resource usage map of the zones of the coverage area.

In accordance with an embodiment of the first aspect, the zonal area resource usage map indicates traffic density in the respective zones, for example selected zones surrounding a specific user equipment, and wherein the transceiver is configured to control resource allocations in the zones of the coverage area using the zonal area resource usage map.

In accordance with an embodiment of the first aspect, when a user equipment moves from one zone in the coverage area of the transceiver to another zone in the coverage area, the transceiver is configured to allocate resources to the user equipment for which the zonal area resource usage map indicates a traffic density below a predefined threshold.

In accordance with an embodiment of the first aspect, when a user equipment moves from one zone in the coverage area of the transceiver to another zone in the coverage area, the transceiver is configured to request the user equipment to use an exceptional pool of resources, for example resources reserved for handover operations, if the resource pool assigned to the other zone shows a congestion level that exceeds a predefined threshold.

In accordance with an embodiment of the first aspect, one or more of the zones of the coverage area of the transceiver overlap with one or more zones of one or more other transceivers of the wireless communication system, and the transceiver is configured to share the zonal area resource usage map with the one or more other transceivers.

Aspect 2

In accordance with a second aspect, it is assumed that mode 3 UEs and mode 4 UEs of a zone share the same resource pool for the sidelink communication. In accordance with the second aspect, the mode 3 UE may broadcast the resources, which the base station has assigned to it, to the mode 4 UEs so that the mode 4 UEs may eliminate the selection of the resources and then carryout the resource sensing in the remaining resources.

In accordance with the second aspect of the inventive approach, a user equipment for a wireless communication system is provided, wherein the user equipment is served by a transceiver of the wireless communication system, a coverage area of the transceiver including one zone or a plurality of zones, and each zone having mapped thereto a resource pool, wherein the user equipment is configured to operate in a first mode of operation, for example the V2X Mode 3, in which scheduling of resources for a sidelink communication with one or more other user equipments is performed by the transceiver, wherein one or more further user equipments are located in the same zone as the user equipment, the further user equipment configured to operate in a accordance with a second mode, for example the V2X Mode 4, wherein the further user equipment is in a non-connected state and is configured to schedule resources of the resource pool for the sidelink communication autonomously, and wherein the user equipment is configured to broadcast the resources, which are assigned to the user equipment by the transceiver, to the further user equipment to allow the further user equipment to eliminate the broadcast resources from the resource pool.

In accordance with the second aspect, resources collisions are effectively avoided as the mode 4 UE eliminates possibly conflicting resources from its resource pool in which it carries out the sensing thereby improving the efficiency of the overall system.

In accordance with an embodiment of the second aspect, the user equipment is configured to broadcast the resources using a sidelink control information message, for example SCI format 0 for D2D communications and SCI format 1 for V2X communications.

In accordance with an embodiment of the second aspect, the user equipment is configured to broadcast the resources, which are assigned to the user equipment by the transceiver, to allow one or more further user equipment located out of the coverage area of the transceiver to eliminate the broadcast resources from the pre-configured resource pool and to carry out the resource sensing in the remaining resources of the pre-configured resource pool.

In accordance with an embodiment of the second aspect, the user equipment may be a cell edge user equipment located at an edge of the coverage area of the transceiver.

Also, the first and second aspects may be implemented together.

Aspect 3

A third second aspect of the inventive approach improving the handing of mode 3 UEs and mode 4 UEs in wireless communication networks concerns switching mode 4 UEs to the mode 3 configuration. One approach would be to simply switch each of the mode 4 UEs that is within the coverage of the base station into the mode 3 configuration, however, this may not be efficient as not each of the UEs operating in the mode 4 actually needs to be switched into the mode 3 configuration. In accordance with the third aspect of the inventive approach an efficient switching of mode 4 UEs which are in coverage of the base station is performed to optimize the use of the available resources. In accordance with the inventive approach of the third aspect, instead of permitting all mode UEs in coverage of the base station to switch to the mode 3 configuration, the switching is only performed once one or more predefined criteria are fulfilled.

In accordance with the third aspect of the inventive approach, a user equipment for a wireless communication system is provided, wherein the user equipment is configured to operate in accordance with a first mode, for example the V2X Mode 4, for a sidelink communication with one or more other user equipments, wherein in the first mode the user equipment is in a non-connected state and is configured to schedule resources for the sidelink communication autonomously, wherein the user equipment, when in a coverage area of a transceiver of the wireless communication system, is configured to switch from the first mode to a second mode, for example the V2X Mode 3, in case one or more predefined criteria are met by the user equipment, and wherein in the second mode scheduling of resources for the sidelink communication with the one or more other user equipments is performed by the transceiver.

Also, in accordance with the third aspect of the inventive approach, a transceiver for a wireless communication system for serving a plurality of user equipments is provided, wherein the transceiver is configured to broadcast system information, for example SIB21, the system information specifying one or more predefined criteria to be met by a certain user equipment to switch from a first mode of operation, for example the V2X mode 4, to a second mode of operation, for example the V2X mode 3, wherein in the first mode of operation the user equipment is in a non-connected state and is configured to schedule resources for a sidelink communication autonomously, and wherein in the second mode of operation scheduling of resources for the sidelink communication with the one or more other user equipments is performed by the transceiver.

In accordance with embodiments, the UE, which is currently in the mode 4 configuration, may switch to the mode 3 configuration once the system information block, for example SIB21, has been received in which one or more of the criteria to be met are indicated, which may be, for example, a time spent by the UE in an idle mode, a speed at which the UE is traveling, a service class of data to be transmitted/received by the UE, and/or an amount of communication traffic to the one or more UEs, like sidelink traffic.

In accordance with an embodiment of the third aspect, the user equipment is configured to switch from the first mode to the second mode responsive to receiving a paging signal from the transceiver, the paging signal indicating that the user equipment is within the coverage area of the transceiver, and responsive to receiving system information, for example SIB21.

In accordance with an embodiment of the third aspect, the predefined criteria include one or more of: (i) a time spent by the user equipment in an IDLE mode, (ii) a speed at which the user equipment is traveling, (iii) a service class of data to be transmitted/received by the user equipment, (iv) an amount of sidelink communications traffic to the one or more other user equipments.

In accordance with an embodiment of the third aspect, when the criterion comprises the time spent by the user equipment in the IDLE mode, the user equipment is configured to switch from the first mode to the second mode when an amount of time the user equipment spent in the coverage area without connecting to the transceiver exceeds a predefined threshold.

In accordance with an embodiment of the third aspect, when the criterion comprises the speed at which the user equipment is traveling, the user equipment is configured to switch from the first mode to the second mode when the speed at which the user equipment travels is below a predefined threshold, or when the speed at which the user equipment travels is below a predefined threshold for a predefined amount of time.

In accordance with an embodiment of the third aspect, the user equipment is categorized into a plurality of mobility states, the mobility states including a normal-mobility state, a medium-mobility state, and a high-mobility state, the user equipment is configured to switch from the first mode to the second mode when the user equipment is categorized to be in the normal-mobility state or in the medium-mobility state, and the user equipment is configured to maintain in the first mode when the user equipment is categorized to be in the high-mobility state.

In accordance with an embodiment of the third aspect, when the criterion comprises the service class of data to be transmitted/received by the user equipment, the user equipment is configured to switch from the first mode to the second mode when the user equipment transmits/receives information of a particular service class having a pre-defined service level.

In accordance with an embodiment of the third aspect, when the criterion comprises the amount of sidelink communications traffic to the one or more other user equipments, the user equipment is configured to switch from the first mode to the second mode when sensing the occupancy status of the resource pool to be used in the first mode of operation indicates a congestion level that exceeds a predefined threshold.

It is noted that the third aspect may be implemented using base stations having their coverage area separated into respective zones, however, the third aspect may also be implemented in base stations which do not implement a separation of the coverage area into respective zones.

It is noted that the third aspect may be implemented using base stations having their coverage area separated into respective zones, however, the second aspect may also be implemented in base stations which do not implement a separation of the coverage area into respective zones.

Also, two or more of the first, second and third aspects may be implemented together.

In the following, the above mentioned aspects will be described in more detail.

Aspect 1

Figure 5:
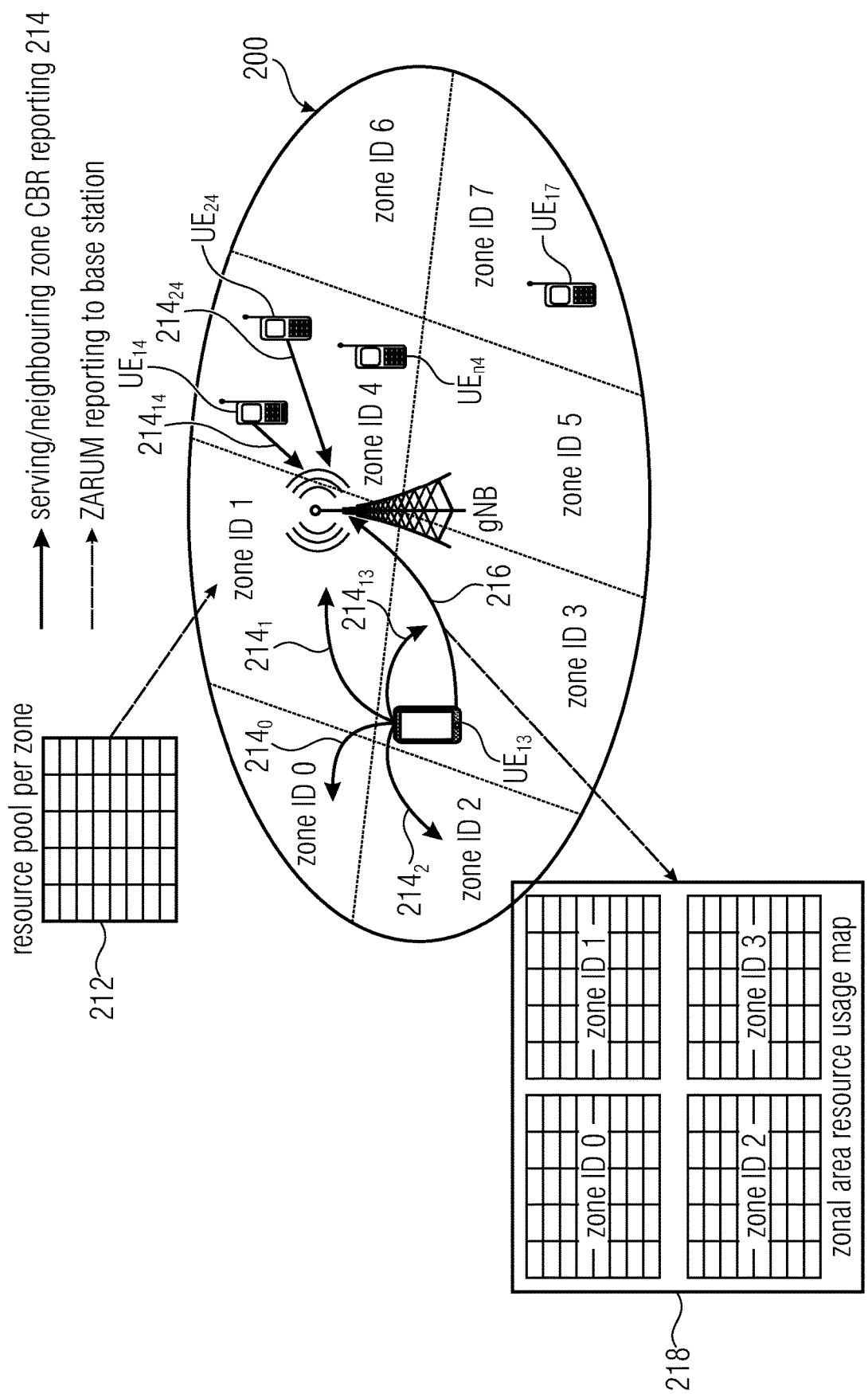
FIG. 5 is a schematic representation of a cell, like a cell in the network of FIG. 1 or FIG. 2, having a coverage area divided into a plurality of zones in accordance with an embodiment.

FIG. 5 is a schematic representation of a cell, like a cell in the network described above with reference to FIG. 1 or FIG. 2. The cell is defined by the coverage 200 (see FIG. 3) of the base station gNB. The coverage area 200 is divided into a plurality of zones, each zone having associated therewith a respective zone ID. The coverage area 200 is subdivided into eight zones having assigned thereto the zone identifiers zone ID 0 to zone ID 7. It is noted that FIG. 5 is only an example of how the coverage area 200 may be separated into the respective zones, and in accordance with other embodiments more or less zones and zones of other shapes may be defined. In accordance with embodiments, the respective zones may be defined in relation to respective latitude and longitude coordinates, and the zones may also be referred to as V2X zones in scenarios in which the inventive approach is implemented for V2X communications. Each of the zones has associated therewith a singular or unique resource pool as is indicated, schematically, at 212. The resource pool 212 per zone may indicate for each of the zones the resources allocated for a sidelink communication among UEs, that are located within the zone. UEs within the same zone may have assigned thereto the respective zone ID. The resource pool 212 may indicate, for example, the frequencies/times that may be used by UEs within a given zone for a sidelink communication with other UEs. This resource pool 212 may be unique both for the UEs in the mode 3 and for UEs in the mode 4 configuration, in accordance with embodiments. In accordance with other embodiments, the coverage area 200 may define a single zone.

FIG. 5 shows in zone 4 a plurality of user equipments $UE_{14}, UE_{24} \ldots UE_{n4}$, and the base station gNB requests only from less than all of the UEs the occupancy status report, for example a CBR reporting. The report is requested from $UE_{14}$ and from $UE_{24}$, as is schematically represented by arrows $214_{14}$ and $214_{24}$, but not from any other UE in zone 4. Since not all of the UEs located within zone 4 transmit the status report to the base station gNB, the signaling overhead associated with the CBR reporting from zone 4 is reduced when compared to a situation in which all UEs send the report. In accordance with embodiments, only a single UE or a subset of the UEs is instructed to return the CBR report to the base station. In accordance with further embodiments, the base station may signal to the respective UEs whether respective CBR measurements are to be carried out or not. In accordance with yet other embodiments, some or all of the UEs within a zone may be configured to automatically perform measurements of the CBR without being instructed to do so by the base station.

In accordance with embodiments, the one or more UEs from one zone are selected dependent on one or more pre-defined criteria. In accordance with an embodiment, the one or more UEs to provide to the base station the report may be selected dependent on the time of an uplink transmission from the UE to the base station. More specifically, the base station, initially, schedules the resources for the uplink transmission, for example by sending a downlink control information message to all the UEs of a zone and, as a consequence, knows a time at which the respective UEs will perform the uplink transmission. The base station, based on this knowledge, may select a single UE as the one to send back the CBR report, and this single UE may be the first one in the uplink transmission period to send uplink information. In accordance with other embodiments, a plurality of UEs may be selected, for example, a number of UEs which will transmit their uplink information within a predefined time period following the scheduling so that, for example, the first two, three or four UEs which will send their uplink information before the remaining UEs in the zone are selected as those UEs which provide the CBR report back to the base station.

Figure 6:
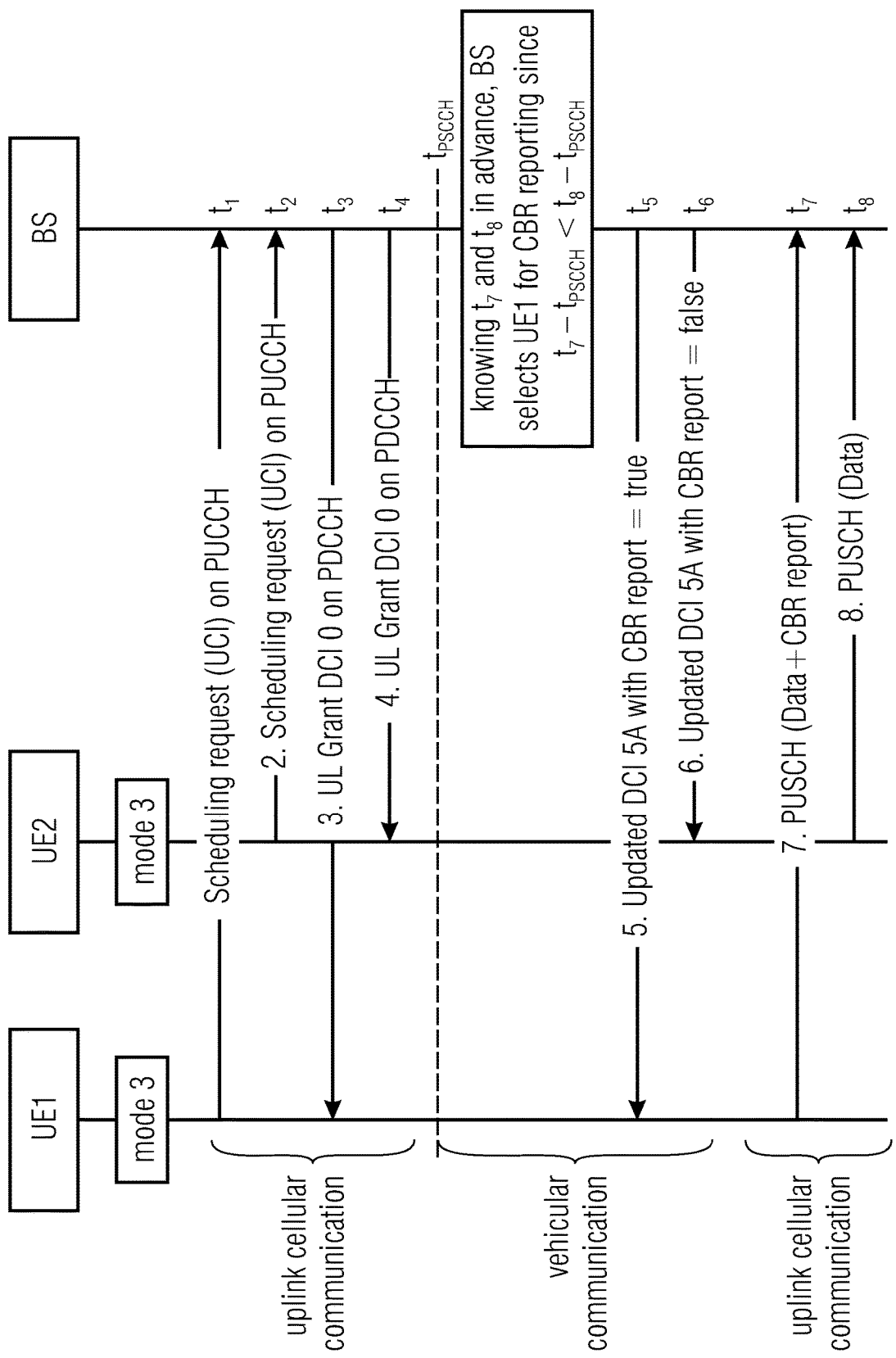
FIG. 6 is a timing diagram illustrating a selection of a single UE for returning a CBR report to a base station in accordance with an embodiment.

FIG. 6 is a timing diagram illustrating the selection of a single UE for returning the CBR report to the base station in accordance with an embodiment. It is assumed that within a zone covered by the base station BS two UEs are located, which are called mode 3 UEs, i.e., UEs that are in a connected state with the base station. Initially, at a time $t_1$ the UE1 sends a scheduling request (UCI—Uplink Control Information) on the PUCCH to the base station BS, and at a time $t_2$ the UE2 sends the scheduling request to the base station BS. At times $t_3$ and $t_4$ respective uplink grants are sent on the PDCCH using DCI format 0 from the base station BS to the UE1 and the UE2, respectively. During further times following time $t_4$ additional UEs that may be present in the zone in which also UE1 and UE2 are present may be scheduled and granted uplink accordingly.

Once the scheduling and granting is completed, the BS knows the times at which the respective UEs will send data in the uplink transmission. Based on this knowledge, the base station determines that the UE1 will transmit in the uplink shared channel at the time $t_7$ prior to the uplink transmission of the UE2 at the time $t_8$ and, also not represented in FIG. 6, all other UEs will perform the uplink transmission at time later than $t_7$. Based on this knowledge, the base station selects UE1 for the CBR reporting, as the time difference between the time $t_7$ and the time $t_{PSCCH}$ (the time at which the transmission of sidelink control information (SCI) over the physical sidelink control channel (PSCCH) occurs) is less than the time difference between the time $t_8$ and $t_{PSCCH}$. Therefore, at time $t_5$ the UE1 is provided with an updated DCI of the format 5A in which a field indicating that the UE is to send a CBR report is set to a first value, e.g., true, while at the time $t_6$ also an updated DCI 5A is sent to the UE2 in which the respective field indicates that no CBR report is to be sent so that it may be set to false. Also, for other UEs in the zone respective updated DCI 5A messages with the field regarding the CBR report to be sent being set to false may be transmitted.

FIG. 7 shows an example of a downlink control indicator of the format 5A which has been modified in accordance with the teachings of the first aspect by adding a single bit Boolean flag 240 indicating to send the CBR report when being set to true and indicating that no CBR report is to be sent when being set to false.

As mentioned above, in accordance with embodiments, UEs may be provided with updated DCI 5A messages indicating that a CBR report is to be sent as long as the time difference between a time at which the respective uplink transmission is carried out and the time $t_{PSCCH}$ is within a predefined time period so that also more than one, but less than all $UE_8$ in the zone may be provided with the request to return the CBR report.

In accordance with other embodiments, instead of selecting UEs for returning the CBR report on the basis of the time at which the uplink transmission occurs, also other criteria may be applied either separately or in combination with the one described with reference to FIG. 6. For example, in accordance with an embodiment one or more UEs may be selected that are already transmitting packets on a regular basis, for example piggybacking on other packets, like UEs running VoLTE (voice over LTE). In accordance with other embodiments, UEs may be selected dependent on the link quality, so that, for example, UEs having a better link quality than other UEs are selected to transmit the CBR report as the transmission of such UEs will be more efficient. Instead of determining the link quality relative to other UEs also UEs may be selected for which the link quality is determined to be beyond a predefined threshold. Yet another embodiment allows selecting the UE to send the report based on a UE class, for example, UEs may be selected that support MIMO modes.

In the embodiments described above, the respective request to send the CBR report to the base station is signaled to the respective UE(s) using the downlink control information messages, like the DCI messages described above with reference to FIG. 6 in which a respective field indicating that at a report is to be transmitted is set either to true or false. These embodiments entail the transmission of an additional DCI message to each of the UEs which may add to the signaling overhead. In accordance with other embodiments, rather than signaling the DCI in the PDCCH or in the PSCCH, the base station may inform the UE(s) upon setting up the connection, for example by utilizing RRC-signaling, whether the UE is to send the report or not. In such cases, rather than relying on the time at which the uplink transmission occurs, the other criteria mentioned above may be used for selecting a UE to send the report or not. Also, when the radio parameters or conditions change and a RRC-reconfiguration occurs, the UEs may again receive, via the RRC signaling the respective information as to whether the CBR report is to be sent by the respective UE or not. Although the RRC-signaling may be slower than the DCI signaling, it reduces the overhead during the actual transmission periods.

The RRC-signaling, in accordance with the embodiments, may include information about the times at which the CBR reporting is to be carried out, for example specific points in time or specific time intervals after which the report is automatically sent may be determined via the RRC-signaling.

Instead of indicating in the DCI message only that the report is to be sent or is not to be sent, additional information may be included, for example a UE may be informed that it is to send the report and, in addition, either respective points in time or time intervals at which the CBR reporting is to be carried out may be included in the downlink control information message, for example in the DCI message, so as to reduce the number of additional DCI messages. A new DCI message changing the settings with regard to the report may be sent in case one or more of specific criteria, like those described above, changed or is no longer met so that another UE from the zone is to be selected as the one sending the report to the BS.

In accordance with the embodiments described above, the coverage area 200 of the base station gNB was assumed to be divided into a plurality of zones, however, the above outlined inventive approach may also be applied to a base station having a coverage area 200 that defines a single zone. In such a scenario, from the plurality of UEs served by the base station less than all of the UEs are selected for sending the CBR report.

In accordance with embodiments, a single CBR report may be provided for each zone, both in cases where the coverage area 200 is divided into multiple zones or in which only a single zone is present. In accordance with other embodiments, multiple reports may be provided for each of the zones or the entire zone, and the base station, on the basis of the reports may generate a complete report for the respective zone or coverage area.

In accordance with further embodiments, a UE that is located within one zone, for example UE13 in FIG. 5, may provide a first CBR report $214_{13}$ concerning the zone having the zone ID 3 in which the $UE_{13}$ is located. In addition, the $UE_{13}$ listens to the neighboring zones having the zone IDs 0, 1 and 2 so as to obtain respective CBR reports $214_0$, $214_1$ and $214_2$ from these zones. For example, a UE may have a radius for obtaining CBR-measurements that is larger than a zone in which the UE is located. The respective reports are returned to the base station gNB, as is indicated at 216. The base station gNB may receive the CBR reports for different zones from one UE or from a small number of UEs that are used within one zone also covering neighboring zones so that the overall signaling for obtaining reports for all zones may be reduced when compared to the case in which a report is obtained from UEs in each zone. For example, when considering the scenario depicted in FIG. 5, a second $UE_{17}$ may be located in zone ID 7 and gather respective zone CBR reports from zones 4, 5, 6 and 7 so that by receiving reports from two UEs the base station gNB may generate respective zonal area resource usage maps for the entire coverage area 200.

In accordance with further embodiments, on the basis of the reports obtained from one or more UEs from the zones, for example on the basis of the reports from $UE_{13}$ a zonal area resource usage map (ZARUM) 218 of the zones in which the $UE_{13}$ is located and which surround the $UE_{13}$ may be generated at the base station which allows the BS to support the allocation of resources based on the traffic density in the surrounding zones of $UE_{13}$, namely in zones 0, 1 and 2. In accordance with embodiments, the ZARUM 218 may include information for each of the zones, and the information may include one or more of the following:
(i) the CBR for each of the zone's resource pools,
(ii) a map of vectors containing the occupancy of the resource blocks for each zone,
(iii) a map containing a list of free resources per resource pool (coming, e.g., from the top-m statistic).

The zonal area resource usage map 218 may provide the base station with knowledge regarding the occupancy status of each of the zone IDs under its coverage, so that, for example, when a UE has to move from one zone ID to another zone ID, but still within the coverage of the same base station, the map enables the base station to provide a set of resources to be used by the moving UE that show a low traffic which, in consequence, provides for a more efficient scheduling. This may be used either in cases in which only for a specific $UE_{13}$ a zonal area resource usage map of the surrounding zones is generated or in cases in which the zonal area resource usage map covers all zones. In accordance with an embodiment, in case it is determined that a new zone ID to which the UE is to be moved, is congested, i.e., the density of traffic is exceeding a specified threshold, the BS may request the UE to use an "exceptional pool of resources" instead of the resource pool assigned to the zone ID to which the UE is moving. The exceptional pool of resources may include a pool of resources used specific processes, like a handover process for UEs among cells. This allows the BS to provide a set of resources having relatively lower traffic for use to the UE as it moves to the new zone ID which results in a more efficient scheduling.

In accordance with yet other embodiments, the zonal area resource usage map may be shared between base stations. Neighboring base stations may have overlapping areas or overlapping zones so that sharing the information already obtained for a specific zone at one base station which is also covered by a neighboring base station allows scheduling the resources upon moving the UE from a zone under a current base station to a zone under a new base station more efficiently.

A further embodiment of the first aspect will now be described which relates to the radio resource pool sharing between UEs using mode 3 and UEs using mode 4. Making reference again to FIG. 5, it is assumed that the coverage 200 (see FIG. 3) of the base station gNB defines a zone, e.g., a single zone, having associated therewith a zone ID and having associated therewith a resource pool 212, e.g., a singular or unique resource pool as is indicated, schematically, at 212. As mentioned above, obtaining an occupancy status report, for example a CBR reporting, from all of the UEs in the zone or coverage 200 of the base station gNB may be disadvantageous. The CBR reporting from all UEs may introduce excess delay and degrade the overall system performance.

In accordance with the inventive approach, this drawback is avoided by obtaining from less than all of the UEs in the zone or coverage 200 the occupancy status report, for example the CBR reporting. For example, the base station gNB may request one or more UEs or a subset of UEs for a CBR reporting, but not all UEs.

If only a subset of all the mode 3 UEs reports a detailed CBR report back to the eNB, in accordance with an embodiment, a criterion that is used to decide the subset is a priority transmission of a packet, e.g. ProSe per Packet Priority, PPPP, service class, or access category. For example, a mode 3 UE having only lower priority transmissions or belonging to a lower access category or belonging to a lower service class may be selected to send the detailed CBR report. Since such a UE is not bound by stringent latency constraints, there will not be caused any latency issue as such.

As mentioned above, in the coverage 200 or zone of the base station gNB there may be present mode 3 UEs and mode 4 UEs. In accordance with further embodiments CBR reporting from a mode 4 UE may be allowed, when one or more mode 4 UEs are in coverage of the base station gNB.

In addition to mode 3 UEs sending CBR reports, also one or more mode 4 UE which are in coverage of a network are configured by the network to report the channel occupancy status to the corresponding base station eNB or gNB. The channel occupancy status may be reported by transmitting a report containing the channel busy ratio, CBR, or channel occupancy ratios, CR, or combinations of CBR and CR or other sorts of occupancy reports.

Figure 7A:
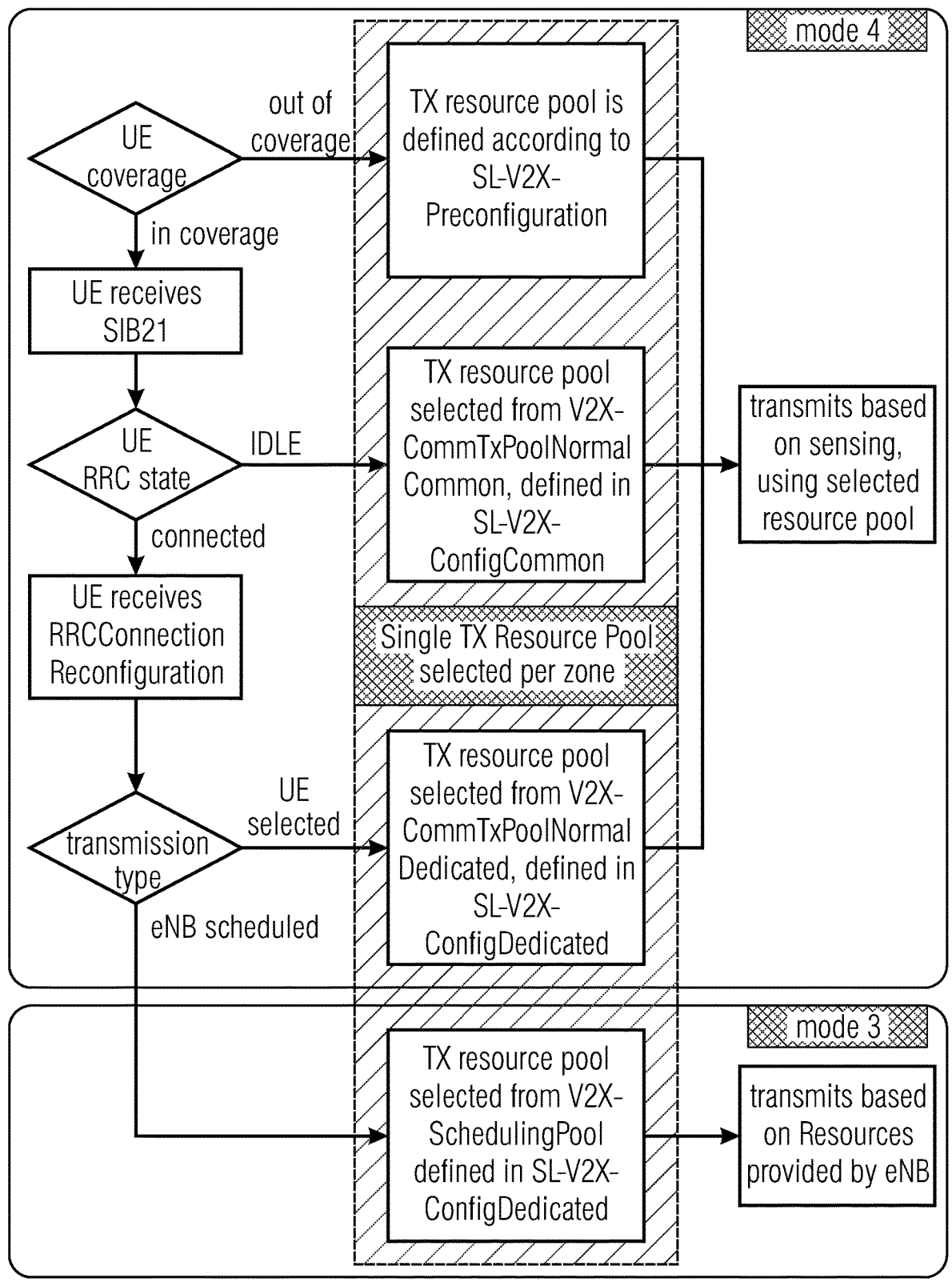
FIG. 7A is a graphical representation of a resource pool selection in accordance with an embodiment of the present invention.

In accordance with embodiments, a mode 4 UE which is in coverage of a network may report the channel occupancy status to the corresponding base station eNB or gNB, according to the state diagram illustrated in FIG. 7A. The state diagram illustrated in FIG. 7A is also a graphical representation of a resource pool selection in accordance with an embodiment of the present invention, which will be described now in more detail.

FIG. 7A refers in the lower part to a Mode 3 UE, and a UE is said to operate in mode 3 only when the eNB schedules the exact resources to be used within a given resource pool. The UE operates in this mode only when in coverage and in an RRC_CONNECTED state.

FIG. 7A refers in the upper part to a Mode 4 UE, and a UE is said to operate in mode 4 when the resource allocation is carried out in a distributed manner by the UE itself. The UE can be either in or out of coverage, as well as in either an RRC_CONNECTED or RRC_IDLE state to function in this mode.

A UE when in coverage and in an RRC_IDLE state, receives SIB21 which contains the information element (IE) SL-V2X-ConfigCommon, which in turn defines the IE V2X-CommTxPoolNormalCommon. This particular IE contains the set of a maximum of 8 transmit resource pool configurations, each of which are defined by the IE SL-CommResourcePoolV2X. The UE also receives the zoneConfig IE which helps the UE in calculating its zoneID (ranges from 0 to 7), and based on this zoneID, selects the singular relevant transmission resource pool from the received set of pools. In the case where the UE does not receive the zoneConfig, it selects the first pool associated with the synchronization reference source.

Similarly, when the UE moves on to the RRC_CONNECTED state, it receives the RRCConnectionReconfiguration message which contains the V2X-CommTxPoolNormalDedicated IE. This IE, provided by the eNB, instructs the UE as to whether it will receive the exact resources for transmission (scheduled, mode 3) or it has to select its own resources for transmission based on sensing (ue-Selected, mode 4).

Depending on this selection, the UE is provided with a set of transmission resource pools. In the scheduled case, the UE is provided with the V2X-SchedulingPool IE, which contains the set of a maximum of 8 transmit resource pool configurations, each of which are defined by the SL-CommResourcePoolV2X IE. In the ue-Selected case, the UE is provided with the V2X-CommTxPoolNormalDedicated IE, which then contains the set of a maximum of 8 transmit resource pool configurations, each of which are defined by the SL-CommResourcePoolV2X IE, as similarly described above. The UE also receives the zoneConfig IE which helps the UE in selecting the singular relevant transmission resource pool from the received set of pools.

Based on the information stated above, it may be seen that there may exist only a single transmit pool associated to a single zoneID, in each of the defined scenarios. Defining the same resource pools for the different scenarios (and their respective IEs) essentially means that mode 3 and mode 4 UEs both share the same resource pool.

Given the complexity of the definitions of each of the resource pools for each scenario, as explained in this section, splitting these resource pools into dedicated and shared pools would pose a significant increase in the signaling overhead in order to ensure that the UEs pick different pools. It also would lead to a fair amount of changes in the existing specification. Sharing the same resource pool among mode 3 and mode 4 UEs avoid such drawbacks.

Furthermore, although the mode 4 UEs may be aware of the resources used by a mode 3 UE or a fellow mode 4 UE thanks to its sensing mechanism, there is no current method to inform the eNB of the usage of the resources in a resource pool by a mode 4 UE, resulting in possible collisions while allocating resources for transmission. In accordance with embodiments this issue is addressed by enabling mode 3 UEs to carry out sensing and resource occupancy reporting to enhance the eNB's resource allocation/scheduling capabilities, which is discussed in more detail below.

Pool Configuration

Both single resource pool configurations, where both mode 3 and mode 4 UEs use a single resource pool configuration and overlap each other partially or fully, and separated/dedicated resource pool configurations, where UEs belonging to each mode have dedicated resource pools and a separate shared resource pool (which may exist within the mode 3 pool), will now be discussed.

In order to understand the issues with a dedicated pool set up, an example is considered where a resource pool with a maximum number of 100 subframes exists, where the bitmap allocates 60 subframes for data transmission and the remaining 40 subframes for data reception, and a total of 10 sub channels, where 6 have been allocated for data transmission and the remaining 4 for data reception. The bitmap may leave out subframes and subchannels for reception due to the half-duplex nature of V2X communications.

Resource Pool Utilization

A logical equal split across the 3 types of pools—dedicated mode 3, dedicated mode 4 and a dedicated shared pool for both mode 3 and 4—results in only 20 subframes and 2 sub channels per type. Not only is this unreasonable considering that the remaining 40% of the resources are open to reception of data and only 20% for transmission, but it also introduces a degree of rigidity to the resource pools. There are scenarios where a mode 3 UE would not have resources to transmit within the dedicated mode 3 pool, and would have to wait for a new resource pool allocation to come in before it can have resources to transmit.

A single resource pool configuration would not face this issue as the entire 60% of the resources are available to both mode 3 and mode 4 UEs for transmission.

Thus, dedicated resource pools are not dynamic in nature and bring in a degree of rigidity to the resource pool allocation which removes the flexibility offered by a single resource pool configuration.

Figure 7B:
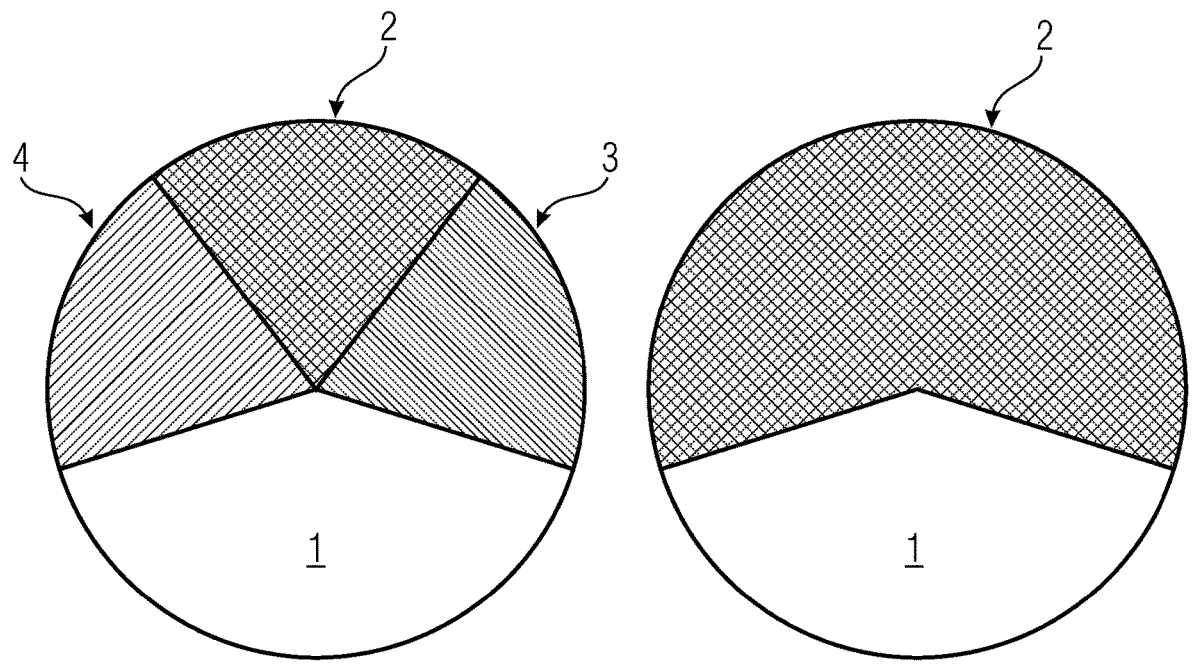
FIG. 7B depicts resource pool usage across respective modes when splitting the resources among 3 types of pools and when using a single resource pool for both modes.

FIG. 7B depicts the resource pool usage across respective modes when splitting the resources among 3 types of pools (left side of FIG. 7B) and when using a single resource pool for both modes (right side of FIG. 7B)

Signaling Overhead

In the case where more resources are needed to be allocated for mode 3 or mode 4 UEs, the configuration for these resource pools may be updated only once via a new SIB21 or RRCConnectionReconfiguration message from the eNB, which is once every radio frame, e.g., every 10 ms. The only way to mitigate this is by increasing the periodicity of the SIB21 transmission or by introducing a new method for signaling, which would cause not only a significant increase in the signaling overhead, but would also cause substantial changes to the existing specifications.

Thus, frequent updating of dedicated resource pools introduces significant signaling overheads, as compared to a single resource pool configuration which functions within the existing specifications.

Sensing Reports

In the case where mode 3 UEs are enabled to carry out sensing and reporting of the resource occupancy status to the eNB, a dedicated shared pool is advantageous as only those UEs using the shared pool are used to transmit this report back to the eNB, as compared to all the mode 3 UEs. Also, the size of the report may smaller as the reported shared resource pool may be smaller when compared to the overall single resource pool.

These advantages also apply for the single resource pool configuration when implementing the inventive approach according the first aspect described herein, in accordance with which only a subset of all mode 3 UEs, but not all mode 3 UEs, send the occupancy report back for a given transmit resource pool to the eNB, thereby reducing the overall number of reports being sent, in order to make the eNB aware of the resources used by mode 4 UEs within the said pool.

The eNB may use this report to compare it with its own resource allocation information and may identify the resources used by mode 4 UEs. Hence the eNB may ensure that these resources are not allocated to mode 3 UEs and avoid any collisions in resource allocation with mode 4 UEs.

Thus, although the usage of a dedicated shared resource pool has advantages in the case where mode 3 UEs would be sending an occupancy report back to the eNB, the same advantages can be transferred to a single resource pool configuration as well.

Therefore, in accordance with embodiments of the present invention, it is of advantage to use a single resource pool configuration for both mode 3 and mode UEs.

Mode 3 UE Reporting

For the implementation of a shared resource pool, in accordance with embodiments, mode 3 UEs are enabled to carry out sensing and reporting the sensing result back to the eNB.

The primary objective of this report is for the eNB to be aware of the interference environment as well as the occupancy of the resources, to be capable of efficiently scheduling resources within a given transmission resource pool.

In accordance with conventional approaches, all UEs carry out a basic level of occupancy and congestion reporting, e.g., in the form of the Channel Busy Ratio (CBR) report and the Channel occupancy Ratio (CR). The CBR essentially provides the eNB with an indication of channel congestion by defining a ratio of the amount of sub channels that exceed a preconfigured RSSI threshold in the previous 100 subframes, whereas the CR is a ratio of the number of sub channels used for transmission by the UE to the total number of sub channels over a 1000 subframe period. While both these values are used by the eNB to manage the congestion of resources, they may be inadequate for the eNB scheduler to avoid probable collisions in resource allocation when both mode 3 and mode 4 share a resource pool.

On the other hand, mode 4 UEs select their resources by measuring the RSRP in the previous 1000 subframes and eliminating resources which are used by the said UE for transmission,
above a preset RSRP threshold (which depends on packet priority), and
reserved by other UEs for future transmissions.

In accordance with conventional approaches, mode 4 UEs do not send this information elsewhere, but just use it for their own resource selection.

If a mode 3 UE were to send reports back to the eNB to assist in resource scheduling, a more detailed version of the CBR report is advantageously used as the UE measures the CBR per subframe anyway, and averages it out to generate the current CBR value. Instead of averaging it out, the UE could provide the CBR values of each of the subframes in a given resource pool, thereby giving the eNB more information regarding the occupancy state of each subframe.

Therefore, in accordance with embodiments of the present invention, it is of advantage that mode 3 UEs send a more detailed version of the CBR report by including the CBR values of each subframe of the resource pool, instead of averaging it out to provide a single value over the entire resource pool.

If a mode 3 UE does generate a detailed CBR report, as mentioned above, or even carries out a sensing process and send this in a report back to the eNB, this may cause an increase in sidelink latency, an increase of the overhead and additional burden on the mode 3 UE. Embodiments of the present invention address these issues in the following manner.

Increased Overhead

In order to tackle the issue of increased overhead, in accordance with embodiments of the present invention, only a subset of all mode 3 UEs, but not all mode 3 UEs, send a detailed CBR report or occupancy report back to the eNB. This is possible as, for the given transmit resource pool, not all UEs are required to send the report, as they will measure the CBR across the same subframes and sub channels, and hence, the reports are redundant for all the UEs within the same pool to be reporting back to the eNB.

As such, the transmission of a CBR report may be based on triggered events V1 and V2. The trigger for sending the report may be based on a variety of parameters, such as link quality, duration of an upcoming PUSCH grant or UE category, along with the existing v1-Threshold and v2-Threshold. These triggers may be defined in the Report-ConfigEUTRA.

Event-triggered reporting may remove the need for any additional signalling procedures for a new reporting mechanism and does not cause any additional overhead. Although the size of the CBR report as such may be larger in the case of a detailed CBR report, since the number of mode 3 UEs reporting to the eNB is significantly lower than in conventional approaches where all UEs transmit the report, the effect of the overhead can be largely mitigated. This also ensures minimal specification changes.

Therefore, in accordance with embodiments of the present invention, only a subset of mode 3 UEs transmit the detailed CBR report to the eNB, using an enhanced set of triggers to set the event in action.

Latency Issues

Another issue to be considered is the excess delay that may be introduced due to the additional reporting. As mentioned above, if only a subset of all the mode 3 UEs is reporting the detailed CBR report back to the eNB, another criteria that may be used to decide the subset is the priority of the V2X transmission. A mode 3 UE having only lower priority transmissions may be selected to send the detailed CBR report, and, since the UE is not bound by stringent latency constraints, this will not cause any latency issue as such.

Therefore, in accordance with embodiments of the present invention, it is of advantage to select the subset of mode 3 UEs based on a lower priority of the transmission, thereby not posing any latency issues to the system.

Second Aspect

Figure 8:
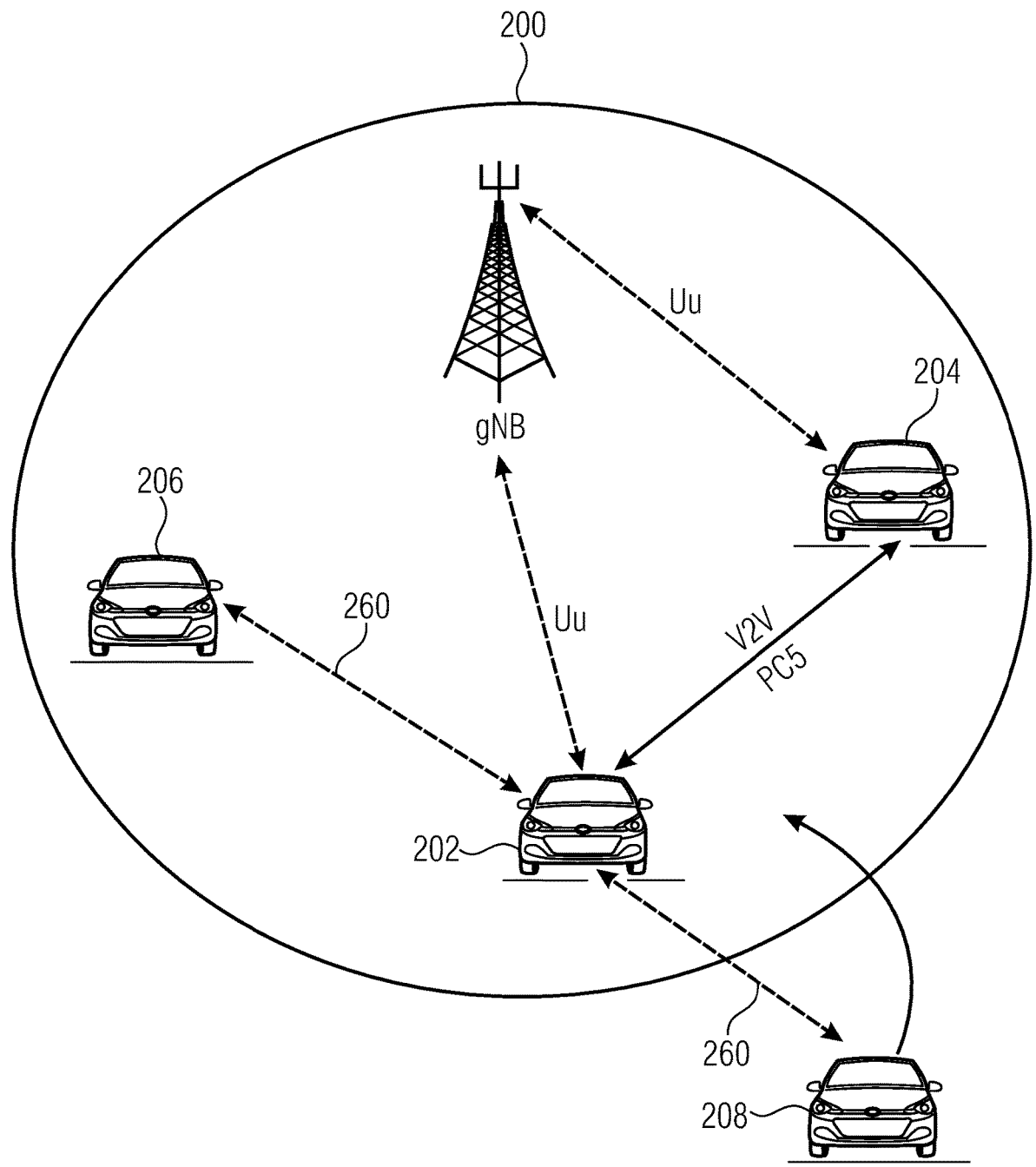
FIG. 8 shows a scenario in accordance with embodiments of the inventive approach in which mode 3 UEs perform a sidelink communication over the PC5 interface under the control of the base station gNB.

In accordance with the second aspect of the inventive approach, UEs operating in the mode 4 configuration may be informed about resources used by mode 3 UEs in the same zone. The resources used and signaled by mode 3 UEs may be eliminated from the resources investigated by the mode 4 UEs for the sidelink communication. More specifically, when considering a scenario as depicted in FIG. 8, the mode 4 UE 206 is within the coverage area 200 of the base station gNB to which the mode 3 UEs 202, 204 are connected. In the example of FIG. 8, it is assumed that the coverage area 200 forms a single zone of the base station, however, in accordance with other embodiments, the UEs 202, 204 and 206 may be within a common zone, for example one of the zones indicated in FIG. 5 into which the coverage area 200 may be divided. In the latter case, all UEs share the same zone ID. In either case, all UEs in the same zone are assumed to use the same resource pool for the SL communication. Conventionally, a mode 4 UE, like UE 206, senses the resources and transmits data, oblivious to the resources which are being used by the mode 3 UEs 202, 204. To avoid resource collisions, in accordance with the second aspect of the inventive approach, the mode 4 UEs, like UE 206, within the same zone as the mode 3 UEs is informed about those resources used by the mode 3 UEs. For example, the UEs 202, 204, which are in the mode 3 configuration, receive their resources for transmission from the base station, for example on the basis of the zone area resource usage map obtained in accordance with the first aspect of the invention. The mode 3 UE 202 transmits or broadcasts a message indicating the resources that have been selected by the base station for this UE, for example, a sidelink control information message, like a SCI format 0 message, in case of a D2D communication, or a SCI format 1 message, in case of a V2X communication. The broadcast is received at the mode 4 UE 206 that is within the same zone, and, responsive to the message, the UE 206 eliminates those resources indicated to be in use by the mode 3 UEs and performs sensing and selection only on the remaining resources. This improves the efficiency for resource allocation as resource conflicts are avoided. In FIG. 8, the broadcast of the resources scheduled by the base station gNB to be used by the mode 3 UE 202 towards the mode 4 UE 206 is schematically represented at 260.

In accordance with embodiments, the report 260 may be transmitted to mode 4 UEs which are not within the coverage area 200 of the base station gNB. Such UEs may receive the broadcast 260 from the UE 202. For example, when considering a further mode 4 UE 208 moving towards the cell 200 it may already receive the broadcast and, therefore, have information about those resources used by the UE 202 so that it can appropriately adjust the resource pool it senses for a sidelink communication.

In embodiments described above, reference has been made to respective vehicles being either in the connected mode, also referred to as mode 3 configuration, or vehicles being in the idle mode, also referred to as mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also in such scenarios, scheduling the resources in accordance with the aspects described above is advantageous as it allows for a more efficient scheduling of resources for sidelink communication avoiding resource collisions and the like.

Third Aspect

In accordance with the third aspect of the inventive approach, a mode 4 UE may be switched to a mode 3 configuration dependent on one or more predefined criteria to be fulfilled. FIG. 8 shows a scenario similar to a combination of FIGS. 2 and 3 in which two mode 3 UEs 202, 204 are within the coverage area 200 of a base station gNB so as to provide for a sidelink communication over the PC5 interface under the control of the base station gNB which performs the scheduling and interference management for the resources to be used for the V2V communication. Thus, the UEs 202, 204, which in the example of FIG. 8 are shown to be vehicles, are in the connected mode as they communicate with the gNB. In addition, it is assumed that a mode 4 UE 206 is within the coverage area 200 but is still out of coverage, i.e., is in the idle state, meaning that it does not communicate with the base station gNB and performs autonomously the scheduling and/or interference management of the resources for a V2V sidelink communication, for example to another vehicle or another entity. The UE 206 operating in the mode 4 configuration may receive a paging signal from the base station of the cell 200 on the basis of which the UE 206 determines to be within coverage. The UE 206 may receive from the base station system information, for example SIB21. Rather than permitting all UEs being in the mode 4 configuration to automatically switch to the mode 3 configuration once the respective UEs determine to be within coverage of a base station, in accordance with the inventive approach a more efficient way of selecting a switching from the mode 4 configuration to the mode 3 configuration. The selective switching may provide several advantages:

(i) Switching all mode 4 UEs to the mode 3 configuration may cause an overload in the cell, which needs to handle a large number of new UEs at a time. This may degrade performance and even lead to situations in which UEs may not be able to connect.

For example, switching all mode 4 UEs to the mode 3 configuration may not be possible or allowed, because the PRACH or other network resources might become overloaded, and other UEs have to be dropped or might not get access to the network at all. When considering, as an example, a starting airplane scenario more than 500 UEs move at high speed through a set of cells on the ground all asking for PRACH or HO (handover) which causes the network to collapse.

Such situations are avoided when implementing an efficient switching strategy in accordance with the inventive approach.

(ii) The signaling overhead associated with a large number of mode 4 UEs entering a cell may be reduced.

(iii) The flexibility of resource allocation may be increased,

In accordance with embodiments, the UE 206 may be switched from the mode 4 configuration to the mode 3 configuration once a certain amount of time has lapsed, for example once a certain amount of time since the UE received the paging signal for the first time has lapsed. In other words, the amount of time the UE 206 remained idle, i.e., non-connected to the base station in FIG. 8 is one criterion for initiating a switching. When this time has been reached, the UE may read the system information and switch to the connected mode, for example the RRC-connected mode.

In accordance with other embodiments, a criterion for switching the UE 206 into the connected mode or mode 3 configuration may the speed at which the UE 206 is traveling. For example, in accordance with embodiments, the UE may be classified based on certain speed dependent scaling rules, for example, it may be categorized into one of three mobility states:
(a) Normal-mobility
(b) Medium-mobility
(c) High-mobility In the normal or medium mobility state, it will be judged that the UE is likely to spend quite some time within the coverage 200 of the base station gNB of FIG. 8 so that it is worthwhile to switch the UE 206 into the connected mode to provide for a more efficient resource use and avoiding resource collisions that may be due to the two configurations used for controlling sidelink communications. When UE 206 is judged to be in a high-mobility state, this indicates that the UE will not be remaining in the cell 200 for a long duration and, therefore, the UE is left in the mode 4 configuration.

Yet another embodiment for switching a mode 4 UE to the mode 3 configuration may be based on a service class of data to be transmitted/received at the UE. For example, a mode 4 UE may switch to the mode 3 configuration in case information of a particular service class are to be transmitted/received. This may also depend on a defined service level. The base station may optimize resources in the mode 3 configuration and prioritize scheduled traffic to services with a highest priority. Table 1 below shows examples for a mapping of priority levels to service classes for UEs being in the mode 4 configuration. In accordance with embodiments, the switching to the mode 3 configuration may be determined for service classes having the highest or a high priority level whereas medium, low or lowest priority level services do not cause a switching of the configuration.

TABLE 1

Priority Levels Mapping for Service Classes in Mode 4 UEs

| V2X Service Class | Priority Level | Service Description |
|---|---|---|
| 1 | Highest | Emergency/Safety Messages |
| 2 | High | Real Time Situational Awareness |
| 3 | Medium | Cooperative Lane Change and See Through Applications |
| 4 | Low | Software/Firmware Updates |
| 5 | Lowest | Informative Messages |

In accordance with another embodiment, switching to the mode 3 configuration may be decided dependent on the sidelink traffic. For example, the UE 206, which controls/manages the resources and/or interference autonomously and senses the respective available resources, may determine a traffic situation regarding the available resources for the SL. In case the UE 206 becomes aware that one or more resources which are used for the sidelink communication are congested to a certain degree, the UE 206 may determine that it is better to switch to the mode 3 configuration so as to have the scheduling carried out by the base station which enhances the sidelink communication.

At this time, it is noted that in accordance with other embodiments, other criteria for selecting the switching of a mode 4 UE to a mode 3 configuration may be applied.

Further, it is noted that the above mentioned criteria may be used isolated from each other or two or more of the criteria may be combined so that only once all of the criteria selected are fulfilled the switching may occur.

In accordance with the third aspect of the inventive approach, rather than having an irregular number of mode 4 UEs being switched to the mode 3 configuration, in accordance with embodiments the inventive approach regulates the switching process on the basis of the above described criteria, for example on the basis of the idle time, the speed and the information to be transmitted/received. When considering the combination of the just-mentioned criteria, namely time, speed, information, this allows longer-staying mode 4 UEs to switch to the mode 3, thereby reducing the number of switches a UE has to carry out. This also ensures that if a mode 4 UE has a high priority message to be sent out which belongs to a certain service type, like an emergency message, it may be switched to mode 3 so that the UE can receive dedicated resources from the base station for transmission with a high reliability.

Mode 4 UEs in the idle mode may periodically monitor the system information for thresholds specified by the base station in relation to time spent in the idle mode, speed of the UE and priority level dependent on the type of information.

FIG. 9 depicts an example of a system information block SIB21 modified in accordance with the third aspect of the present invention by defining, as is indicated at 250, the respective sidelink-V2X-mode switch-thresholds, like the idle time, the UE speed and the priority messages. Upon reading the system information block, for example the one as shown in FIG. 9, the UE 206 (see FIG. 8) may trigger the mode switch by comparing its current parameters with the thresholds in the SIB, namely the respective parameters indicated at 250 in FIG. 9.

Although the respective aspects have been described separate from each other, it is noted that two or more of the aspects may be combined.

Further, in the above-described embodiments, reference has been made to base stations, however, the inventive approach is not limited to base stations as described above with reference to FIG. 1 or FIG. 2, rather, it applies to any transceiver apparatus in a wireless communication network or system for providing a wireless communication with a user equipment having a configuration as outlined above. Thus, the transceivers in accordance with the inventive approach may comprise the above-described base stations but also other entities, like road side units, moving base stations, street furniture (e.g. lamp posts, traffic lights, bus stops, . . . ), platoon leaders.

Figure 1:
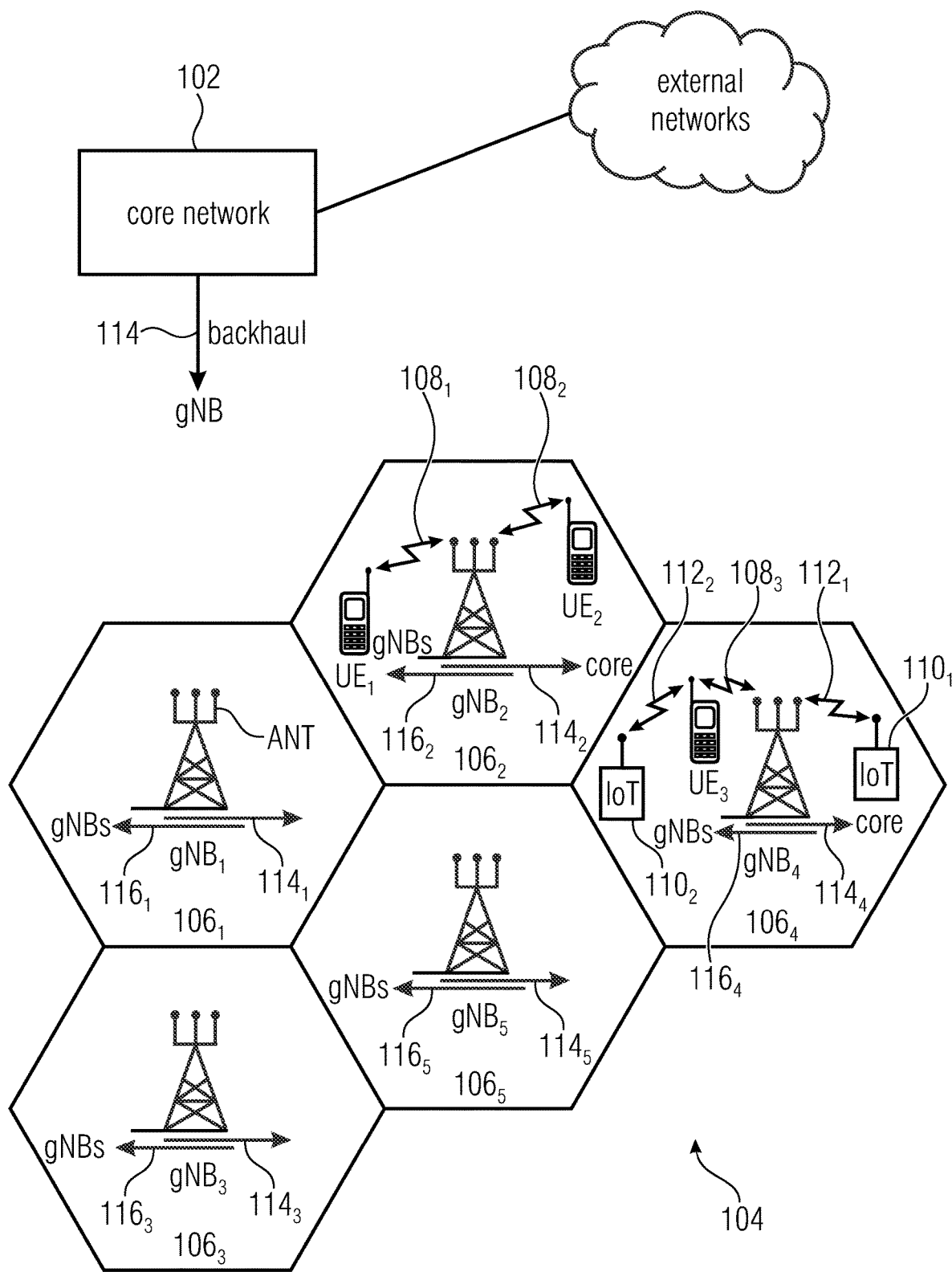
FIG. 1 shows a schematic representation of an example of a wireless communication system.
Figure 2:
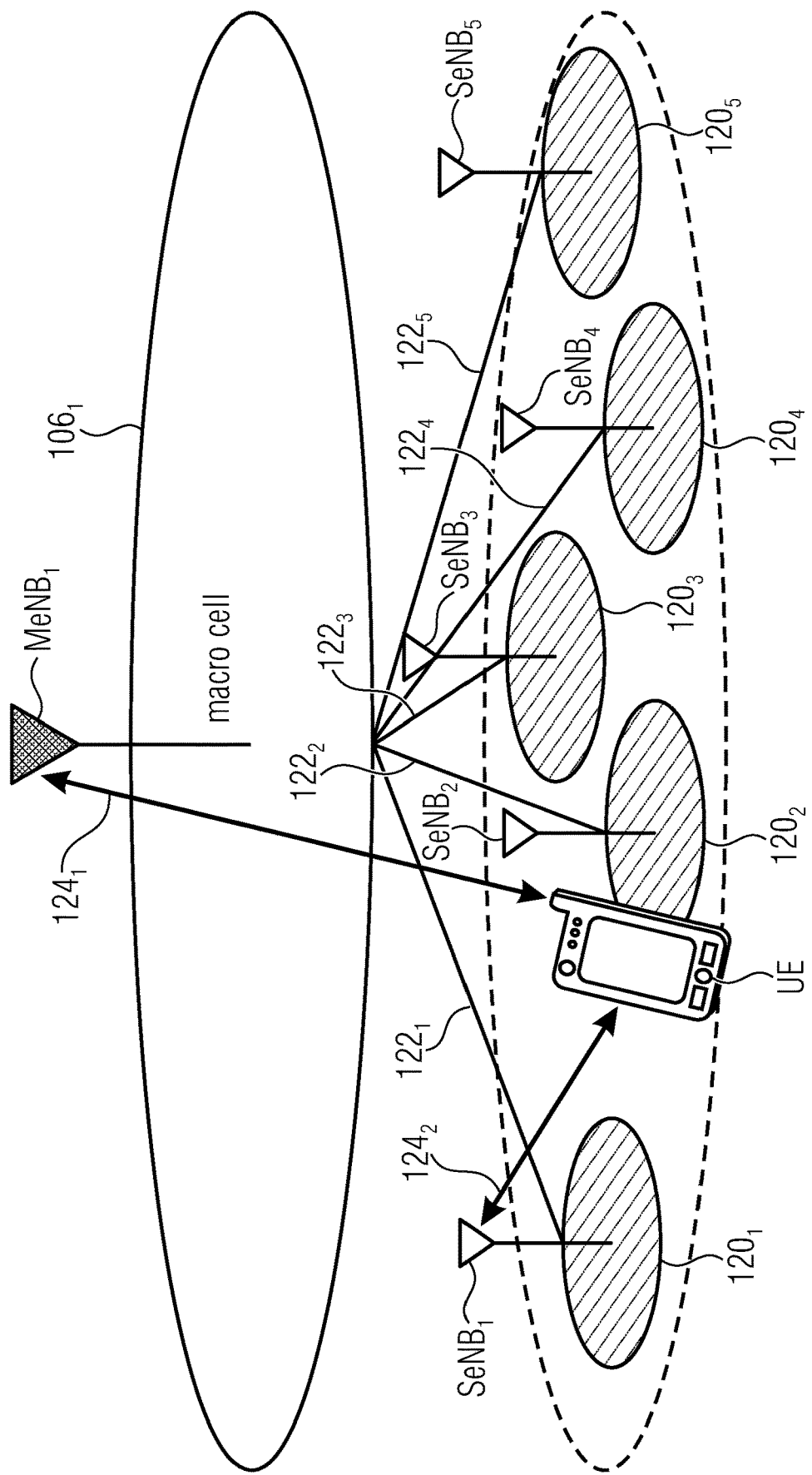
FIG. 2 is a schematic representation of a cell, like cell $106_1$ in FIG. 1, having two distinct overlaid networks, the networks comprising a macro cell network including the macro cell $106_1$, and a small cell network.
Figure 10:
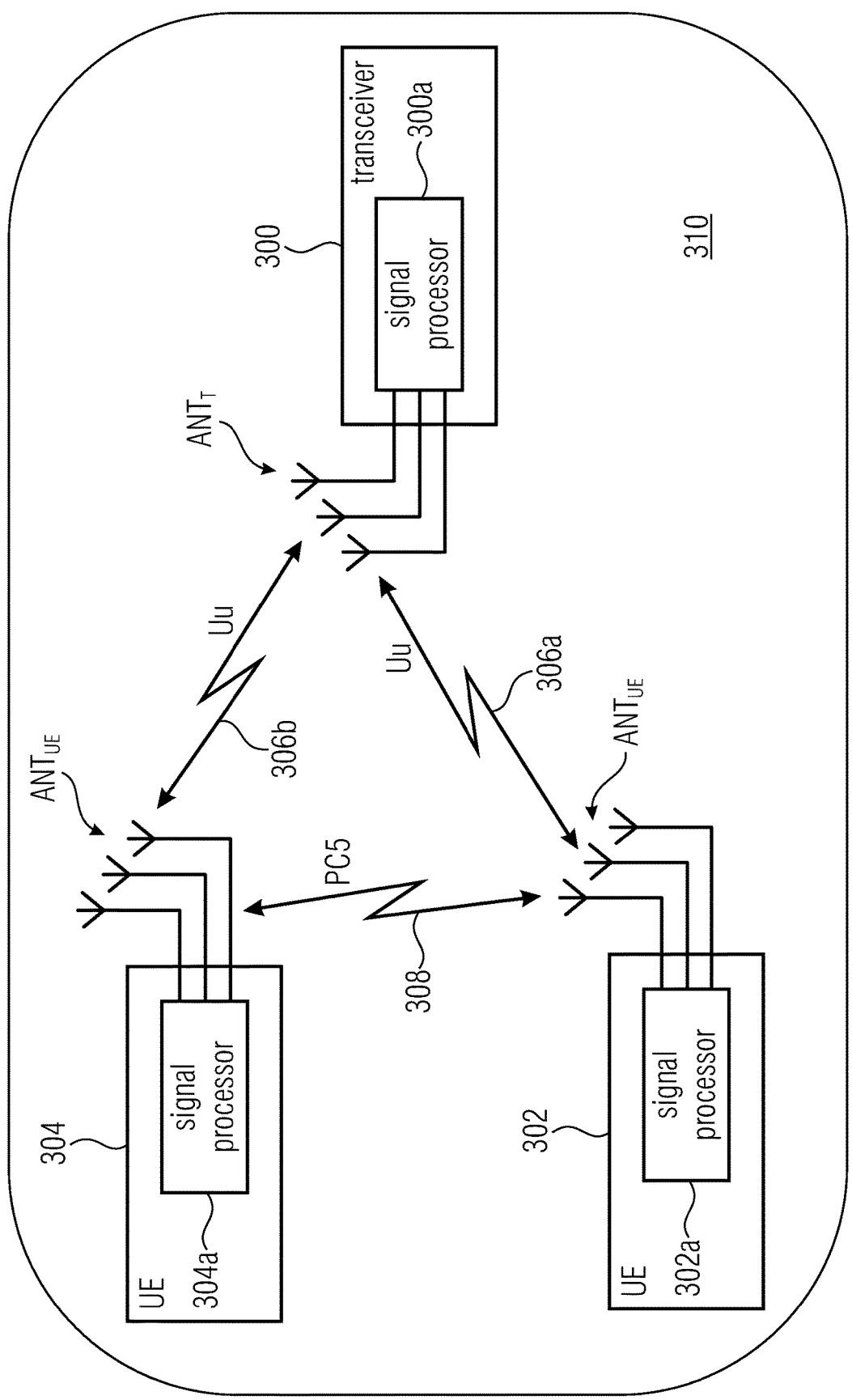
FIG. 10 is a schematic representation of a wireless communication system for communicating information between a transceiver 300 and a plurality of UEs 302, 304 operating in accordance with the present invention.

Embodiments of the present invention may be implemented in a wireless communication system as depicted in FIG. 1 or FIG. 2 including base stations and users, like mobile terminals or IoT devices. FIG. 10 is a schematic representation of a wireless communication system for communicating information between a transceiver 300 and a plurality of UEs 302, 304. The transceiver 300 and the UEs 302, 304 may communicate via respective first wireless communication links 306a and 306b, like a radio link using the Uu interface. Further, the UEs 302, 304 may communicate with each other via a second wireless communication link 308, like a radio link using the PC5 interface. The transceiver 300 includes one or more antennas $ANT_T$ or an antenna array having a plurality of antenna elements, and a signal processor 300a. The transceiver 300 may operate in accordance with the inventive teachings described herein. Each of the UEs 302 and 304 includes one or more antennas $ANT_{UE}$ or an antenna array having a plurality of antenna elements, and a signal processor 302a, 304a. The respective UEs may operate in accordance with the inventive teachings described herein.

In accordance with the first aspect of the inventive approach, the transceiver 300 of the wireless communication system serves the plurality of UEs 302, 304. A coverage area 310 of the transceiver includes one zone (as shown in FIG. 10) or a plurality of zones. Each zone having mapped thereto a resource pool. The transceiver 300 signals to less than all the UEs 302, 304 assigned to a certain zone to return to the transceiver 300 a zone occupancy report for the certain zone. The zone occupancy report indicates an occupancy status of the resource pool mapped to the certain zone. In accordance with the first aspect of the inventive approach, one or more of the UEs 302, 304 are served by the transceiver 300 of the wireless communication system, and, responsive to a request from the transceiver 300, return to the transceiver 300 the zone occupancy report.

In accordance with the second aspect of the inventive approach, the UE 302, 304 is served by the transceiver 300. The UE 302, 304 operates in the first mode of operation. In case a further UE(s) is/are located in the same zone as the UE 302, 304, the further UE(s) operating in a accordance with the second mode, the UE 302, 304 broadcasts the resources, which are assigned to the UE 302, 304 by the transceiver 300, to the further UE(s) to allow the further UE(s) to eliminate the broadcast resources from the resource pool.

In accordance with the third aspect of the inventive approach, the one or more of the UEs 302, 304 operate in accordance with a first mode, for example the V2X Mode 4, for the sidelink communication 308 with one or more other user equipments. In the first mode the UE is in a non-connected state and schedules resources for the sidelink communication autonomously. When the UE 302, 304 is the coverage area 310 of the transceiver 300, it may switch from the first mode to a second mode, for example the V2X Mode 3, in case one or more predefined criteria are met by the UE 302, 304. In the second mode scheduling of resources for the sidelink communication 308 with the one or more other user equipments is performed by the transceiver. In accordance with the third aspect of the inventive approach, the transceiver 300 broadcasts system information, for example SIB21. The system information specify one or more pre-defined criteria to be met by a UE, 302, 304 to switch from the first mode of operation to the second mode of operation.

In accordance with embodiments described, the transceiver, like the BS, signals to less than all UEs assigned to a certain zone to return to the transceiver a zone occupancy report for the certain zone. Thus, in accordance with embodiments the BS does not send a broadcast to all UEs but only to those UEs from which the report is desired. For example, signaling to a UE may include that the transceiver sends a configuration message using, e.g., RRC signaling. The configuration message may be referred to as MeasSensing-Config information element. The IE MeasSensing-Config may specify the input factors for sensing measurement as specified in TS 36.213 [9], and, in accordance with embodiments the MeasSensing-Config information element may include the following:

```
-- ASN1START
MeasScaleFactor-r12 ::=        SEQUENCE {
   sensingSubchannelNumber     INTEGER (1..20),
   sensingPeriodicity          ENUMERATED {ms20, ms50, ms100,
                               ms200, ms300, ms400, ms500, ms500,
                               ms600, ms700, ms800, ms900, ms1000},
```

-continued

```
   sensingReselectionCounter   INTEGER (5..75),
   sensingPriority             INTEGER (1..8)
}
-- ASN1STOP
``` wherein

"sensingReselectionCounter"
indicates the value of SL_RESOURCE_RESELECTION_COUNTER, which is used to derive $C_{resel}$, as specified in TS 36.213 [9] section 14.1.1.4B.
sensingSubchannelNumber
indicates the number of sub-channels, i.e., parameter $L_{subCH}$, as specified in TS 36.213 [9] section 14.1.1.6.
sensingPeriodicity
indicates the resource reservation interval, i.e., parameter $P_{rsvp\_TX}$, as specified in TS 36.213 [9] section 14.1.1.6.
sensingPriority
indicates the priority to be transmitted in the associated SCI format 1 by the UE, i.e., parameter $prio_{TX}$ as specified in TS 36.213 [9] section 14.1.1.6

For example, the eNB or BS may configure the UE to report as follows:
2> set the measResultSensing to include the sensing measurement results in accordance with the following:
  3> if the triggerType is set to periodical:
    4> include the applicable transmission resource pools for which the new measurement results became available since the last periodical reporting or since the measurement was initiated or reset;
  3> for each transmission resource pool to be reported:
    4> if sensing measurement result that has not been reported is available:
      5> set the sensingResult to the sensing measurement results provided by the lower layers;

The occupancy report includes, for example, one or a combination of the a usage ratio, like CBR (channel busy ratio), and a resource vector giving the occupancy for resource blocks, and, in accordance with embodiments, the usage ratio, like the CBR (channel busy ratio) may correspond to information about the used/unused resources over time, e.g., per subframe. In accordance with other embodiments, the resource vector giving the occupancy for resource blocks may be based on information about the used/unused resources over time, e.g., per subframe. The report may be signaled from a UE to the BS using, e.g., RRC signaling, by an information element, IE, covering, e.g., measured results for intra-frequency, inter-frequency and inter-RAT mobility. The IE may be referred to as MeasResults information element, and, in accordance with embodiments the MeasResults information element may include, among other information, the following information used for specifying the usage ratio and/or the resource vector:

```
MeasResultSensing-r15 ::= SEQUENCE {
s1-SubframeRef-r15        INTEGER (0..10239),
sensingResult-r15         SEQUENCE (SIZE (0..400)) OF SensingResult-r15
}
SensingResult-r15 ::= SEQUENCE {
resourceIndex-15          INTEGER (SIZE (1..2000))
}
``` wherein

"sl-SubframeRef" indicates the subframe corresponding to n+T1 of the time interval where sensing measurement results are obtained (see TS 36.213 [9]). Specifically, the value indicates the timing offset with respect to subframe #0 of DFN #0 in milliseconds, and "resourceIndex" indicates the available resource candidate within the [T1, T2] window as specified in TS 36.213 [9] section 14.1.1.6. Value 1 indicates the resource candidate on the subframe indicated by sf-sl-SubframeRef, for subchannel 0 to sensingSubchannelNumber−1. Value 2 indicates the resource candidate on the first subframe following the subframe indicated by SubframeRef, for subchannel 0 to sensingSubchannelNumber−1 (Value 101 indicates the resource candidate on the subframe indicated by SubframeRef, for subchannel 1 to sensingSubchannelNumber, if the numSubchannel of the resource pool is larger than sensingSubchannelNumber) and so on.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Samsung, "Resource pool sharing between mode 3 and mode 4 UEs", 3GPP Technical Document—R1-1713537, Prague-Czech Republic, RAN1 #90, August 2017.
[2] Ericsson, "Pool Sharing between Mode-3 and Mode-4", 3GPP Technical Document—R2-1709373, Berlin-Germany, RAN2 #99, August 2017
[3] Intel, "Resource Pool Sharing between mode 3 and mode 4", 3GPP Technical Document—R2-1709049, Berlin-Germany, RAN2 #99, August 2017.
[4] Huawei, "Discussion on resource pool sharing between mode3 and mode4 UEs", 3GPP Technical Document—R2-1707969, Berlin-Germany, RAN #2, August 2017.
[5] ZTE, "Consideration on resource pool sharing between UEs using mode 3 and mode 4", 3GPP Technical Document—R2-1708510, Berlin-Germany, RAN #2, August 2017.
[6] 3GPP TS 36.331 V14.2.0, Radio Resource Control (RRC) Protocol Specification, March 2017.
[7] 3GPP TS 36.304 V14.4.0, UE procedures in Idle mode, September 2017.
[8] 3GPP TS 36.212 V14.4.0, Multiplexing and channel coding, September 2017.
[9] 3GPP TS 36.213 V14.4.0, Physical channels and modulation, September 2017.

The invention claimed is:

1. A user device, UE, for a wireless communication system, comprising:
an antenna; and
a signal processor,
wherein the user device is served by a base station of the wireless communication system, a coverage area of the base station comprising one geographical zone or a plurality of geographical zones, and each geographical zone having mapped thereto a resource pool,
wherein the user device is to perform a measurement of resources of the resource pool for the geographical zone in which the user device is located, for determining whether a resource of the resource pool is used or unused,
wherein, responsive to a request from the base station, the signal processor is to create, using the measurement, a zone occupancy report for the geographical zone in which the user device is located, the zone occupancy report indicating an occupancy status of the resource pool mapped to the geographical zone, the zone occupancy report being returned to the base station via the antenna,
wherein the zone occupancy report comprises one or a combination of the following:
(i) a resource vector giving the occupancy for resource blocks of the resource pool,
(ii) a predefined number of resources of the resource pool, wherein
(i) the resource vector indicates a percentage of occupancy per set of physical resource blocks, PRBs, or indicates the free PRBs, and
(ii) the predefined number of resources per resource pool are top-m resource blocks based on a statistic of the least occupied PRBs or the PRBs comprising the lowest received power,
wherein the user device is to operate in accordance with a first mode, the V2X Mode 4, for a sidelink communication with one or more other user devices, wherein in the first mode the user device is in a non-connected state and is to schedule resources for the sidelink communication autonomously,
wherein the user device, when in a coverage area of a transceiver of the wireless communication system, is to switch from the first mode to a second mode, the V2X Mode 3, in case one or more predefined criteria are met by the user device, and
wherein, in the second mode, scheduling of resources for the sidelink communication with the one or more other user devices is performed by the transceiver.

2. The user device, UE, of claim 1, wherein the user device is to acquire the zone occupancy status for one or more further geographical zones, the one or more further geographical zones neighboring a geographical zone in which the user device is located.

3. The user device, UE, of claim 1, wherein each geographical zone of the coverage area of the base station is identified by a zone identifier, and wherein the user device located within a geographical zone of the coverage area of the base station has associated therewith the zone identifier of the geographical zone.

4. A wireless communication system, comprising:
one or more base stations, and
one or more user devices, UEs, the one or more UEs comprising:
an antenna; and
a signal processor,
wherein the user device that is served by one of the one or more base stations, a coverage area of the base station comprising one geographical zone or a plurality of geographical zones, and each geographical zone having mapped thereto a resource pool,
wherein the user device is to perform a measurement of resources of the resource pool for the geographical zone in which the user device is located, for determining whether a resource of the resource pool is used or unused,
wherein, responsive to a request from the base station, the signal processor is to create, using the measurement, a zone occupancy report for the geographical zone in which the user device is located, the zone occupancy report indicating an occupancy status of the resource pool mapped to the geographical zone, the zone occupancy report being returned to the base station via the antenna,
wherein the zone occupancy report comprises one or a combination of the following:
(i) a resource vector giving the occupancy for resource blocks of the resource pool,
(ii) a predefined number of resources of the resource pool, wherein
(i) the resource vector indicates a percentage of occupancy per set of physical resource blocks, PRBs, or indicates the free PRBs, and
(ii) the predefined number of resources per resource pool are top-m resource blocks based on a statistic of the least occupied PRBs or the PRBs comprising the lowest received power,
wherein the user device is to operate in accordance with a first mode, the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, the V2X Mode 3, in case one or more predefined criteria are met by the user device, and wherein, in the second mode, scheduling of resources for the sidelink communication with the one or more other user devices is performed by the transceiver.

5. The wireless communication system of claim 4, wherein the one or more user devices comprise Vehicle to Everything, V2X, Mode 3 user devices or Vehicle to Everything, V2X, Mode 4 user devices.

6. The wireless communication system of claim 5, wherein the base station comprises one or more of, a macro cell base station, a small cell base station, a road side unit, and wherein the one or more user devices comprises one or more of a vehicle and another device network comprising connectivity enabling a communication using the wireless communication system.

7. A method for a user device for a wireless communication system, the user device being served by a base station of the wireless communication system, a coverage area of the base station comprising one geographical zone or a plurality of geographical zones, and each geographical zone having mapped thereto a resource pool, the method comprising:

performing, by the user device, a measurement of resources of the resource pool for the geographical zone in which the user device is located, for determining whether a resource of the resource pool is used or unused, responsive to a request from the base station, creating, using the measurement, and returning, by the user device, to the base station a zone occupancy report for the geographical zone in which the user device is located, the zone occupancy report indicating an occupancy status of the resource pool mapped to the geographical zone, wherein the occupancy report comprises one or a combination of the following:

(i) a resource vector giving the occupancy for resource blocks, (ii) a predefined number of resources of the resource pool, and wherein (i) the resource vector indicates a percentage of occupancy per set of physical resource blocks, PRBs, or indicates the free PRBs, and (ii) the predefined number of resources per resource pool are top-m resource blocks based on a statistic of the least occupied PRBs or the PRBs comprising the lowest received power, wherein the user device is to operate in accordance with a first mode, the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, the V2X Mode 3, in case one or more predefined criteria are met by the user device, and wherein, in the second mode, scheduling of resources for the sidelink communication with the one or more other user devices is performed by the transceiver.

8. A non-transitory digital storage medium having stored thereon a computer program including instructions that, when executed by a processor of a computer, cause the computer to perform a method for a user device for a wireless communication system, the user device being served by a base station of the wireless communication system, a coverage area of the base station comprising one geographical zone or a plurality of geographical zones, and each geographical zone having mapped thereto a resource pool, the method comprising:

performing, by the user device, a measurement of resources of the resource pool for the geographical zone in which the user device is located, for determining whether a resource of the resource pool is used or unused, responsive to a request from the base station, creating, using the measurement, and returning, by the user device, to the base station a zone occupancy report for the geographical zone in which the user device is located, the zone occupancy report indicating an occupancy status of the resource pool mapped to the geographical zone, wherein the zone occupancy report comprises one or a combination of the following:

(i) a resource vector giving the occupancy for resource blocks of the resource pool, (ii) a predefined number of resources of the resource pool, and wherein (i) the resource vector indicates a percentage of occupancy per set of physical resource blocks, PRBs, or indicates the free PRBs, and (ii) the predefined number of resources per resource pool are top-m resource blocks based on a statistic of the least occupied PRBs or the PRBs comprising the lowest received power, wherein the user device is to operate in accordance with a first mode, the V2X Mode 4, for a sidelink communication with one or more other user devices, wherein in the first mode the user device is in a non-connected state and is to schedule resources for the sidelink communication autonomously, wherein the user device, when in a coverage area of a transceiver of the wireless communication system, is to switch from the first mode to a second mode, the V2X Mode 3, in case one or more predefined criteria are met by the user device, and wherein, in the second mode, scheduling of resources for the sidelink communication with the one or more other user devices is performed by the transceiver.

* * * * *